(12) United States Patent
Adams et al.

(10) Patent No.: US 8,359,339 B2
(45) Date of Patent: Jan. 22, 2013

(54) GRAPHICAL USER INTERFACE FOR CONFIGURATION OF AN ALGORITHM FOR THE MATCHING OF DATA RECORDS

(75) Inventors: Norm Adams, Cave Creek, AZ (US); Scott Schumacher, Northridge, CA (US); Doug Spelce, Austin, TX (US); Jason Woods, Round Rock, TX (US); Brad S. Jacobs, Stone Mountain, GA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/702,410

(22) Filed: Feb. 5, 2007

(65) Prior Publication Data
US 2011/0010401 A1    Jan. 13, 2011

(51) Int. Cl.
*G06F 17/30*   (2006.01)
(52) U.S. Cl. ........................................................ 707/805
(58) Field of Classification Search .................. 707/200, 707/6–7, 805
See application file for complete search history.

(56) References Cited

U.S. PATENT DOCUMENTS

| | | | | |
|---|---|---|---|---|
| 4,531,186 | A | * | 7/1985 | Knapman ............................. 1/1 |
| 5,020,019 | A | * | 5/1991 | Ogawa .................................. 1/1 |
| 5,134,564 | A | | 7/1992 | Dunn et al. |
| 5,247,437 | A | | 9/1993 | Vale et al. |
| 5,321,833 | A | * | 6/1994 | Chang et al. ......................... 1/1 |
| 5,323,311 | A | | 6/1994 | Fukao et al. |
| 5,333,317 | A | | 7/1994 | Dann |
| 5,381,332 | A | | 1/1995 | Wood |
| 5,442,782 | A | | 8/1995 | Malatesta et al. |
| 5,497,486 | A | | 3/1996 | Stolfo et al. |
| 5,535,322 | A | | 7/1996 | Hecht |
| 5,535,382 | A | * | 7/1996 | Ogawa .................................. 1/1 |
| 5,537,590 | A | | 7/1996 | Amado |
| 5,555,409 | A | | 9/1996 | Leenstra et al. |
| 5,561,794 | A | | 10/1996 | Fortier |
| 5,583,763 | A | | 12/1996 | Atcheson et al. |
| 5,600,835 | A | * | 2/1997 | Garland et al. ....................... 1/1 |
| 5,606,690 | A | * | 2/1997 | Hunter et al. .................. 715/255 |
| 5,615,367 | A | | 3/1997 | Bennett et al. |
| 5,640,553 | A | * | 6/1997 | Schultz ................................. 1/1 |
| 5,651,108 | A | | 7/1997 | Cain et al. |

(Continued)

FOREIGN PATENT DOCUMENTS

WO    9855947 A1    12/1998

(Continued)

OTHER PUBLICATIONS

Fair, "Record Linkage in the National Dose Registry of Canada", European Journal of Cancer, vol. 33, Supplement 3, pp. S37-S43, Apr. 1997.

(Continued)

*Primary Examiner* — Sheree N Brown
(74) *Attorney, Agent, or Firm* — Elissa Y. Wang; Edell, Shapiro & Finnan, LLC

(57) ABSTRACT

Systems and methods for an interface for the configuration of a system for the association of data records are disclosed. Embodiments of the invention provide a graphical interface for manipulating a representation of an algorithm for the configuration of such a system, including the configuration of how a system transforms data records from their native format to a standard data format, selects set of candidates and associates data records.

45 Claims, 33 Drawing Sheets

U.S. PATENT DOCUMENTS

| | | | |
|---|---|---|---|
| 5,675,752 A | 10/1997 | Scott et al. | |
| 5,675,753 A | 10/1997 | Hansen et al. | |
| 5,694,593 A * | 12/1997 | Baclawski | 1/1 |
| 5,694,594 A | 12/1997 | Chang | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Anderson | |
| 5,774,887 A | 6/1998 | Wolff et al. | |
| 5,778,370 A | 7/1998 | Emerson | |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A | 9/1998 | Wong et al. | |
| 5,819,264 A | 10/1998 | Palmon et al. | |
| 5,835,712 A | 11/1998 | DuFresne | |
| 5,835,912 A | 11/1998 | Pet | |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A | 3/1999 | Casey | |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A | 11/1999 | Ellard | |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A | 1/2000 | Kirsch et al. | |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A | 8/2000 | Medl | |
| 6,134,581 A | 10/2000 | Ismael et al. | |
| 6,185,608 B1 | 2/2001 | Hon et al. | |
| 6,223,145 B1 | 4/2001 | Hearst | |
| 6,269,373 B1 | 7/2001 | Apte et al. | |
| 6,297,824 B1 | 10/2001 | Hearst et al. | |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,356,931 B2 | 3/2002 | Ismael et al. | |
| 6,374,241 B1 | 4/2002 | Lamburt et al. | |
| 6,385,600 B1 | 5/2002 | McGuinness et al. | |
| 6,389,429 B1 | 5/2002 | Kane et al. | |
| 6,446,188 B1 | 9/2002 | Henderson et al. | |
| 6,449,620 B1 | 9/2002 | Draper | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 | 2/2003 | Borthwick | |
| 6,529,888 B1 | 3/2003 | Heckerman et al. | |
| 6,556,983 B1 | 4/2003 | Altschuler et al. | |
| 6,557,100 B1 | 4/2003 | Knutson | |
| 6,621,505 B1 | 9/2003 | Beauchamp et al. | |
| 6,633,878 B1 | 10/2003 | Underwood | |
| 6,633,882 B1 | 10/2003 | Fayyad et al. | |
| 6,633,992 B1 | 10/2003 | Rosen | |
| 6,647,383 B1 | 11/2003 | August et al. | |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,742,003 B2 | 5/2004 | Heckerman et al. | |
| 6,757,708 B1 | 6/2004 | Craig et al. | |
| 6,795,793 B2 | 9/2004 | Shayegan et al. | |
| 6,807,537 B1 | 10/2004 | Thiesson et al. | |
| 6,842,761 B2 | 1/2005 | Diamond et al. | |
| 6,879,944 B1 | 4/2005 | Tipping et al. | |
| 6,907,422 B1 | 6/2005 | Predovic | |
| 6,912,549 B2 * | 6/2005 | Rotter et al. | 1/1 |
| 6,922,695 B2 | 7/2005 | Skufca et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 | 5/2006 | Robson | |
| 7,099,857 B2 | 8/2006 | Lambert | |
| 7,143,091 B2 | 11/2006 | Charnock et al. | |
| 7,155,427 B1 | 12/2006 | Prothia | |
| 7,181,459 B2 | 2/2007 | Grant et al. | |
| 7,249,131 B2 | 7/2007 | Skufca et al. | |
| 7,330,845 B2 | 2/2008 | Lee et al. | |
| 7,487,173 B2 | 2/2009 | Medicke et al. | |
| 7,526,486 B2 | 4/2009 | Cushman, II et al. | |
| 7,567,962 B2 | 7/2009 | Chakrabarti et al. | |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 | 8/2010 | Ionescu | |
| 8,321,383 | 11/2012 | Schumacher et al. | |
| 8,321,393 | 11/2012 | Adams et al. | |
| 2002/0007284 A1 | 1/2002 | Schurenberg et al. | |
| 2002/0073099 A1 | 6/2002 | Gilbert et al. | |
| 2002/0080187 A1 | 6/2002 | Lawton | |
| 2002/0087599 A1 | 7/2002 | Grant et al. | |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 | 10/2002 | Nye | |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 | 6/2003 | Kring et al. | |
| 2003/0120630 A1 | 6/2003 | Tunkelang | |
| 2003/0145002 A1 | 7/2003 | Kleinberger et al. | |
| 2003/0158850 A1 | 8/2003 | Lawrence et al. | |
| 2003/0174179 A1 | 9/2003 | Suermondt et al. | |
| 2003/0182101 A1 | 9/2003 | Lambert | |
| 2003/0195836 A1 | 10/2003 | Hayes et al. | |
| 2003/0195889 A1 | 10/2003 | Yao et al. | |
| 2003/0195890 A1 | 10/2003 | Oommen | |
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 | 9/2004 | Heckerman et al. | |
| 2004/0220926 A1 | 11/2004 | Lamkin et al. | |
| 2004/0260694 A1 | 12/2004 | Chaudhuri et al. | |
| 2005/0004895 A1 | 1/2005 | Schurenberg et al. | |
| 2005/0015381 A1 | 1/2005 | Clifford et al. | |
| 2005/0015675 A1 | 1/2005 | Kolawa et al. | |
| 2005/0050068 A1 | 3/2005 | Vaschillo et al. | |
| 2005/0055345 A1 | 3/2005 | Ripley | |
| 2005/0060286 A1 | 3/2005 | Hansen et al. | |
| 2005/0071194 A1 | 3/2005 | Bormann et al. | |
| 2005/0075917 A1 | 4/2005 | Flores et al. | |
| 2005/0114369 A1 | 5/2005 | Gould et al. | |
| 2005/0149522 A1 | 7/2005 | Cookson et al. | |
| 2005/0154615 A1 | 7/2005 | Rotter et al. | |
| 2005/0210007 A1 | 9/2005 | Beres et al. | |
| 2005/0228808 A1 | 10/2005 | Mamou et al. | |
| 2005/0240392 A1 | 10/2005 | Munro et al. | |
| 2005/0256740 A1 | 11/2005 | Kohan et al. | |
| 2005/0256882 A1 | 11/2005 | Able et al. | |

| | | | |
|---|---|---|---|
| 2005/0273452 | A1 | 12/2005 | Molloy et al. |
| 2006/0053151 | A1 | 3/2006 | Gardner et al. |
| 2006/0053172 | A1 | 3/2006 | Gardner et al. |
| 2006/0053173 | A1 | 3/2006 | Gardner et al. |
| 2006/0053382 | A1 | 3/2006 | Gardner et al. |
| 2006/0064429 | A1 | 3/2006 | Yao |
| 2006/0074832 | A1 | 4/2006 | Gardner et al. |
| 2006/0074836 | A1 | 4/2006 | Gardner et al. |
| 2006/0080312 | A1 | 4/2006 | Friedlander et al. |
| 2006/0116983 | A1 | 6/2006 | Dettinger et al. |
| 2006/0117032 | A1 | 6/2006 | Dettinger et al. |
| 2006/0129605 | A1 | 6/2006 | Doshi |
| 2006/0129971 | A1 | 6/2006 | Rojer |
| 2006/0136205 | A1 | 6/2006 | Song |
| 2006/0161522 | A1 | 7/2006 | Dettinger et al. |
| 2006/0167896 | A1 | 7/2006 | Kapur et al. |
| 2006/0179050 | A1 | 8/2006 | Giang et al. |
| 2006/0190445 | A1 | 8/2006 | Risberg et al. |
| 2006/0195560 | A1 | 8/2006 | Newport |
| 2006/0265400 | A1 | 11/2006 | Fain et al. |
| 2006/0271549 | A1 | 11/2006 | Rayback et al. |
| 2006/0287890 | A1 | 12/2006 | Stead et al. |
| 2007/0005567 | A1 | 1/2007 | Hermansen et al. |
| 2007/0016450 | A1 | 1/2007 | Bhora et al. |
| 2007/0055647 | A1 | 3/2007 | Mullins et al. |
| 2007/0067285 | A1 | 3/2007 | Blume et al. |
| 2007/0073678 | A1 | 3/2007 | Scott et al. |
| 2007/0073745 | A1 | 3/2007 | Scott et al. |
| 2007/0094060 | A1 | 4/2007 | Apps et al. |
| 2007/0150279 | A1 | 6/2007 | Gandhi et al. |
| 2007/0192715 | A1 | 8/2007 | Kataria et al. |
| 2007/0198481 | A1 | 8/2007 | Hogue et al. |
| 2007/0198600 | A1 | 8/2007 | Betz |
| 2007/0214129 | A1 | 9/2007 | Ture et al. |
| 2007/0214179 | A1 | 9/2007 | Hoang |
| 2007/0217676 | A1 | 9/2007 | Grauman et al. |
| 2007/0250487 | A1 | 10/2007 | Reuther |
| 2007/0260492 | A1 | 11/2007 | Feied et al. |
| 2007/0276844 | A1 | 11/2007 | Segal et al. |
| 2007/0276858 | A1 | 11/2007 | Cushman et al. |
| 2007/0299697 | A1 | 12/2007 | Friedlander et al. |
| 2007/0299842 | A1* | 12/2007 | Morris et al. ............ 707/7 |
| 2008/0005106 | A1 | 1/2008 | Schumacher et al. |
| 2008/0016218 | A1 | 1/2008 | Jones et al. |
| 2008/0069132 | A1 | 3/2008 | Ellard et al. |
| 2008/0120432 | A1 | 5/2008 | Lamoureux et al. |
| 2008/0126160 | A1 | 5/2008 | Takuechi et al. |
| 2008/0243832 | A1 | 10/2008 | Adams et al. |
| 2008/0243885 | A1 | 10/2008 | Harger et al. |
| 2008/0244008 | A1 | 10/2008 | Wilkinson et al. |
| 2009/0089317 | A1 | 4/2009 | Ford et al. |
| 2009/0089332 | A1 | 4/2009 | Harger et al. |
| 2009/0089630 | A1 | 4/2009 | Goldenberg et al. |
| 2009/0198686 | A1 | 8/2009 | Cushman, II et al. |
| 2010/0114877 | A1 | 5/2010 | Adams et al. |
| 2010/0174725 | A1 | 7/2010 | Adams et al. |
| 2010/0175024 | A1 | 7/2010 | Schumacher et al. |
| 2011/0010214 | A1 | 1/2011 | Carruth |
| 2011/0010346 | A1 | 1/2011 | Goldenberg et al. |
| 2011/0010401 | A1 | 1/2011 | Adams et al. |
| 2011/0010728 | A1 | 1/2011 | Goldenberg et al. |
| 2011/0047044 | A1 | 2/2011 | Wright et al. |
| 2011/0191349 | A1 | 8/2011 | Ford et al. |

FOREIGN PATENT DOCUMENTS

| | | | |
|---|---|---|---|
| WO | 0159586 | | 8/2001 |
| WO | 0159586 | A2 | 8/2001 |
| WO | 0175679 | A1 | 10/2001 |
| WO | 03021485 | | 3/2003 |
| WO | 2004023297 | A1 | 3/2004 |
| WO | 2004023311 | A1 | 3/2004 |
| WO | 2004023345 | A1 | 3/2004 |
| WO | 2009042931 | A1 | 4/2009 |
| WO | 2009042941 | A1 | 4/2009 |

OTHER PUBLICATIONS

International Search Report and Written Opinion, for PCT/US2007/012073, Mailed Jul. 23, 2008, 12 pages.

International Preliminary Report on Patentability Issued in PCT/US2007/013049, Mailed Dec. 17, 2008.

International Search Report and Written Opinion issued in PCT/US2007/013049, mailed Jun. 13, 2008.

Office Action issued in U.S. Appl. No. 11/809,792, mailed Aug. 21, 2009, 14 pages.

Oracle Data Hubs: "The Emperor Has No Clothes?", Feb. 21, 2005, Google.com, pp. 1-9.

IEEE, no matched results, Jun. 30, 2009, p. 1.

IEEE, no matched results, 1 pg., Sep. 11, 2009.

Office Action issued in U.S. Appl. No. 11/522,223 dated Aug. 20, 2008, 16 pgs.

Office Action issued in U.S. Appl. No. 11/522,223 dated Feb. 5, 2009, Adams, 17 pages.

Notice of Allowance issued for U.S. Appl. No. 11/522,223, dated Sep. 17, 2009, 20 pages.

De Rose, et al. "Building Structured Web Community Portals: A Top-Down, Compositional, and Incremental Approach", VDLB, ACM, pp. 399-410, Sep. 2007.

Microsoft Dictionary, "normalize", at p. 20, Fifth Edition, Microsoft Corp., downloaded from http://proquest.safaribooksonline.com/0735614954 on Sep. 8, 2008.

Office Action issued in U.S. Appl. No. 11/521,928 dated Apr. 1, 2009, 22 pages.

Office Action issued in U.S. Appl. No. 11/521,928 dated Sep. 16, 2008, 14 pages.

Notice of Allowance issued for U.S. Appl. No. 11/521,928, dated Sep. 18, 2009, 20 pages.

Gopalan Suresh Raj, Modeling Using Session and Entity Beans, Dec. 1998, Web Comucopia, pp. 1-15.

Scott W. Ambler, Overcoming Data Design Challenges, Aug. 2001, pg. 1-3.

XML, JAVA, and the future of the Web, Bosak, J., Sun Microsystems, Mar. 10, 1997, pp. 1-9.

Hamming Distance, HTML. Wikipedia.org, Available: http://en.wikipedia.org/wiki/Hamming_distance (as of May 8, 2008).

Office Action Issued in U.S. Appl. No. 11/521,946 mailed May 14, 2008, 10 pgs.

Office Action issued in U.S. Appl. No. 11/521,946 mailed Dec. 9, 2008, 10 pgs.

Office Action issued in U.S. Appl. No. 11/521,946 mailed May 13, 2009, 12 pgs.

Freund et al., Statistical Methods, 1993, Academic Press Inc., United Kingdom Edition, pp. 112-117.

Waddington, D., "Does it signal convergence of operational and analytic MDM?" retrieved from the internet:<URL: http://www.intelligententerprise.com>, 2 pages, Aug. 2006.

International Search Report mailed on Oct. 10, 2008, for PCT Application No. PCT/US07/20311 (10 pp).

International Search Report and Written Opinion issued in PCT/US07/89211, mailing date of Jun. 20, 2008.

International Search Report and Written Opinion for PCT/US08/58404, dated Aug. 15, 2008.

International Preliminary Report on Patentability Under Chapter 1 for PCT Application No. PCT/US2008/058665, issued Sep. 29, 2009, mailed Oct. 8, 2009, 6 pgs.

International Search Report and Written Opinion mailed on Dec. 3, 2008 for International Patent Application No. PCT/US2008/077985.

Gu, Lifang, et al., "Record Linkage: Current Practice and Future Directions," CSIRO Mathematical and Informational Sciences, 2003, pp. 1-32.

O'Hara-Schettino, et al., "Dynamic Navigation in Multiple View Software Specifications and Designs," Journal of Systems and Software, Vol. 41, Issue 2, May 1998, pp. 93-103.

International Search Report and Written Opinion mailed on Oct. 10, 2008 for PCT Application No. PCT/US08/68979.

International Search Report and Written Opinion mailed on Dec. 2, 2008 for PCT/US2008/077970.

International Search Report and Written Opinion mailed on Aug. 28, 2008 for Application No. PCT/US2008/58665, 7 pgs.

C.C. Gotlieb, Oral Interviews with C.C. Gotlieb, Apr. 1992, May 1992, ACM, pp. 1-72.

Google.com, no match results, Jun. 30, 2009, p. 1.

Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rate (Auto-Link Threshold)", Publicly available on Apr. 2, 2009; memorandum.
Jason Woods, "Workbench 8.0 Bucket Analysis Tools", Publicly available on Apr. 2, 2009.
"Parsing" Publicly available on Oct. 2, 2008.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support viaMemtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO As a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1-Draft; Publicly available on Oct. 2, 2008.
Initiate, "Arriba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #NNNN Conditional Governance", Version 1.0-Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005.
End User Training CMT; CIO Maintenance Tool (CMT) Training Doc; Publicly available on Sep. 29, 2006.
"HierarchyViewer—OGT 3.0t", Publicly available on Sep. 25, 2008.
"Building and Searching the OGT", Publicly available on Sep. 29, 2006.
Sean Stephens, "Requirement Specification B2B Web Client Architecture", Version 0.1-Draft; Publicly available on Sep. 25, 2008.
"As of: OGT 2.0", Publicly available on Sep. 29, 2006.
Initiate, "Memtype Expansion Detailed Design", Publicly available on Apr. 2, 2009.
Initiate,"Java SDK Self-Training Guide", Release 7.0; Publicly available on Mar. 24, 2006.
Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115, 1995.
Merriam-Webster dictionary defines "member" as "individuals", 2008.
Martha E. Fair, et al., "Tutorial on Record Linkage Slides Presentation", Chapter 12, pp. 457-479, Apr. 1997.
Ohgaya, Ryosuke et al., "Conceptual Fuzzy Sets-, NAFIPS 2002, Jun. 27-29, 2002, pp. 274-279.Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008.
Initiate, "Implementation Defined Segments—Gap Analysis", Publicly available on Mar. 20, 2008.
"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.

* cited by examiner

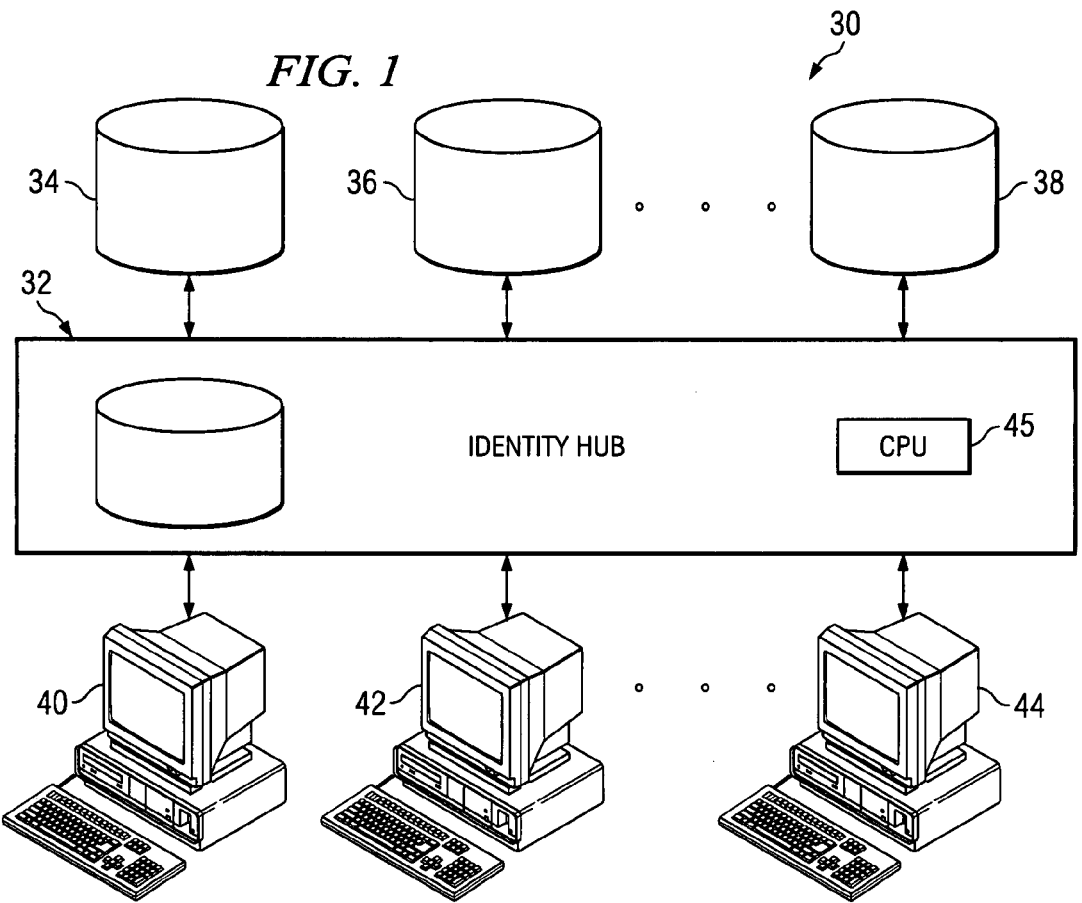

GRAPHICAL USER INTERFACE FOR CONFIGURATION OF AN ALGORITHM FOR THE MATCHING OF DATA RECORDS

TECHNICAL FIELD OF THE INVENTION

This invention relates generally to associating data records, and in particular to identifying data records that may contain information about the same entity such that these data records may be associated. Even more particularly, this invention relates to the configuration of an algorithm for statistical identification of data records for association.

BACKGROUND

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to other relevant pieces of data about the same entity. The databases also permit a person to query the database to find data records pertaining to a particular entity, such that data records from various data stores pertaining to the same entity may be associated with one another.

A data store, however, has several limitations which may limit the ability to find the correct data about an entity within the data store. The actual data within the data store is only as accurate as the person who entered the data, or an original data source. Thus, a mistake in the entry of the data into the data store may cause a search for data about an entity in the database to miss relevant data about the entity because, for example, a last name of a person was misspelled or a social security number was entered incorrectly, etc. A whole host of these types of problems may be imagined: two separate record for an entity that already has a record within the database may be created such that several data records may contain information about the same entity, but, for example, the names or identification numbers contained in the two data records may be different so that it may be difficult to associate the data records referring to the same entity with one other.

For a business that operates one or more data stores containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed, and prevent the user from picking the wrong data record, it is also desirable to identify and associate data records from the various information sources that may contain information about the same entity. There are conventional systems that locate duplicate data records within a database and delete those duplicate data records, but these systems may only locate data records which are substantially identical to each other. Thus, these conventional systems cannot determine if two data records, with, for example, slightly different last names, nevertheless contain information about the same entity. In addition, these conventional systems do not attempt to index data records from a plurality of different information sources, locate data records within the one or more information sources containing information about the same entity, and link those data records together. Consequently, it would be desirable to be able to associate data records from a plurality of information sources which pertain to the same entity, despite discrepancies between attributes of these data records.

As data records from various sources may be different in both format and in the data which they contain, however, the configuration of these systems may present a Herculean task. These difficulties are in part caused because the configuration process may be a manually intensive task requiring a great deal of specialized knowledge of the architecture and abilities of the system being utilized for association of data records and, in addition, a large degree of programming skill and minute attention to detail to ensure that the resulting configuration of the algorithm(s) used to associate data records will yield the desired results. More specifically, in many instances the systems used for associating data records may be configured via a script which assigns various configuration parameters and values within the system. Consequently, it is difficult to obtain an overall concept of how the configured algorithm will function and errors may be made during configuration of the algorithm such that the algorithm does not function, either at all or as intended.

Adding to the difficulty of configuring these systems, the detection of problems in the configuration of these algorithms may likewise require a large degree of expertise: the algorithm may be in a valid but incorrect or undesired configuration which may yield results similar to, but not the same as, those desired. Perceiving these variations is difficult, and furthermore, if these problems are detected, reconfiguring the algorithm as originally intended may take time as well, as the original script or program used to configure the system may have to be debugged to discover where the algorithm was configured incorrectly.

Thus, there is a need for system and methods for configuring an algorithm for the association of data records which may allow an operator to both visualize and verify the configuration of the algorithm, and it is to this end that embodiments of the present invention are directed.

BRIEF SUMMARY

Systems and methods for an interface for the configuration of a system for the association of data records are disclosed. Embodiments of the invention provide a graphical interface for manipulating a representation of an algorithm for the configuration of such a system, including the configuration of how a system transforms data records from their native format to a standard data format, selects sets of candidates and associates data records.

In one embodiment, an algorithm represents a collection of objects along with a series of relationships between these objects. The objects may be core attributes or data representing the data to which the matching is applied and are explicitly defined, derived attributes, which are internal representations of the data, standardization functions which may create derived data from core data, bucketing functions which consume derived data and produce data for bucket grouping or comparison functions which consume derived data for two members and produce a score. A member may be a set of demographic information that represents one individual (e.g., a person or organization) or object (e.g., car or machine part) or almost anything else.

Embodiments of the present invention may provide the technical advantage of providing a compact and easily understandable way to create and edit an algorithm for the configuration of a system for the matching or association of data records. In fact, certain embodiments may allow a user to be graphically presented with the various attributes or functions which such a system may be configured to utilize and validate or verify an algorithm constructed by a user at various stages of the construction of the representation of the algorithm or when is attempted to configure the system using an algorithm corresponding to the constructed representation.

Furthermore, embodiments of the present invention may allow a current configuration of a system to be loaded and represented graphically for a user, such that a user can edit the representation to change the configuration of the systems. Embodiments of the present invention may also provide the ability to allow a user to load any one of a number of templates comprising representations of various configurations and further edit these representations to create a desired configuration. Part and parcel, a user may be allowed to save any number of created representations in a file for further editing at a later time.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein (e.g., generate an appropriate threat rating or threat score for each event.) Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE SEVERAL VIEWS OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 depicts one embodiment of an example infrastructure.

FIGS. 2A and 2B depict a representation of two embodiments of data records.

DETAILED DESCRIPTION

Figure 2B:
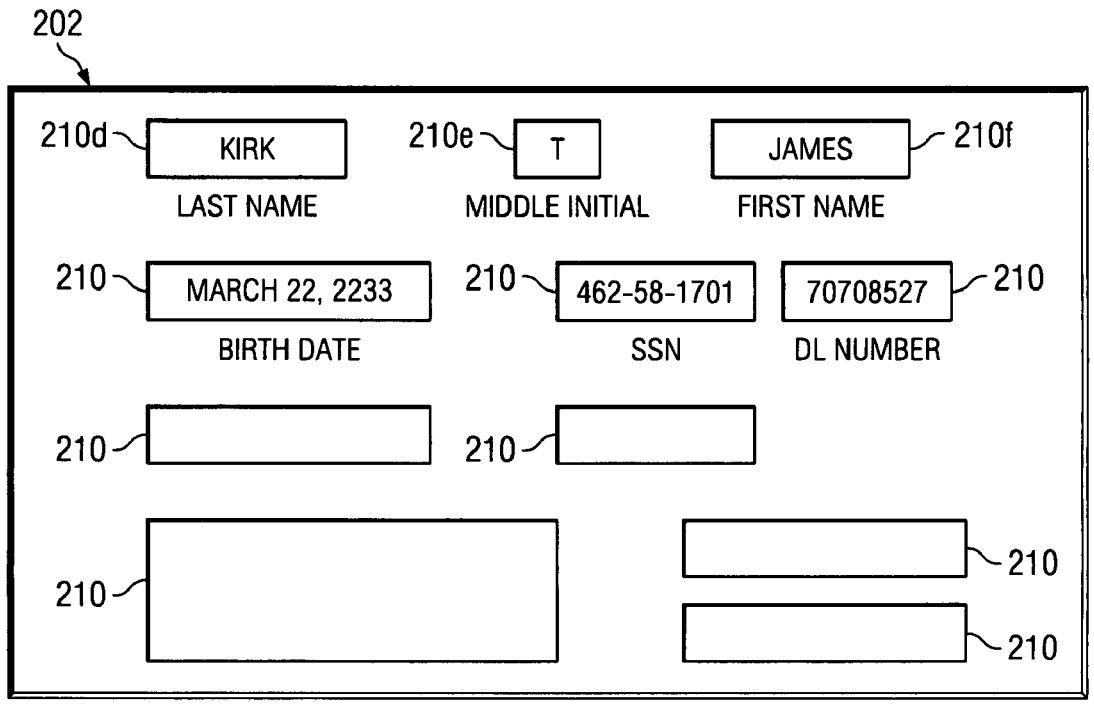

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Before turning to embodiments of the present invention, a general description of an example infrastructure or context which may be helpful in explaining these various embodiments will be described. A block diagram of one embodiment of just such an example infrastructure is described in FIG. 1. FIG. 1 is a block diagram illustrating one embodiment of an entity processing system 30 in accordance with embodiments of the invention. The entity processing system 30 may include an identity hub 32 that processes, updates or stores data pertaining to data records about one or more entities from one or more data sources 34, 36, 38 and responds to commands or queries from a plurality of operators 40, 42, 44, where the operators may be either users or information systems. The identity hub 32 may operate with data records from a single information source or, as shown, data records from multiple information sources. The entities tracked using the identity hub 32 may include for example, patients in a hospital, participants in a health care system, parts in a warehouse or any other entity that may have data records and information contained in data records associated with it. The identity hub 32 may be one or more computer systems with a central processing unit 45 executing computer readable instructions (e.g., a software application) that performs the function of the identity hub 32. The identity hub 32 may also be implemented using hardware circuitry.

As shown, the identity hub 32 may receive data records from the data sources 34, 36, 38 as well as write corrected data back into the information sources 34, 36, 38. The corrected data communicated to the data sources 34, 36, 38 may include information that was correct, but has changed, information about fixing information in a data record or information about links or associations between data records.

In addition, one of the operators 40, 42, 44 may transmit a query to the identity hub 32 and receive a response to the query back from the identity hub 32. The one or more data sources 34, 36, 38 may be, for example, different databases that possibly have data records about the same entities. For example, in the health care field, each information source 34, 36, 38 may be associated with a particular hospital in a health care organization and the health care organization may use the identity hub 32 to relate the data records associated with the plurality of hospitals so that a data record for a patient in Los Angeles may be located when that same patient is on vacation and enters a hospital in New York. The identity hub 32 may be located at a central location and the data sources 34, 36, 38 and users 40, 42, 44 may be located remotely from the identity hub 32 and may be connected to the identity hub 32 by, for example, a communications link, such as the Internet or any other type communications network, such as a wide area network, intranet, wireless network, leased network, etc.

The identity hub 32 may have its own database that stores complete data records in the identity hub, or alternatively, the identity hub may also only contain sufficient data to identify a data record (e.g., an address in a particular data source 34, 36, 38) or any portion of the data fields that comprise a complete data record so that the identity hub 32 can retrieve the entire data record from the data source 34, 36, 38 when needed. The identity hub 32 may link data records together containing information about the same entity utilizing an entity identifier or an associative database separate from actual data records. Thus, the identity hub 32 may maintain links between data records in one or more data sources 34, 36, 38, but does not necessarily maintain a single uniform data record for an entity.

More specifically, the identity hub may link data records in data sources 34, 36, 38 by comparing a data record (received from an operator, or from a data source 34, 36, 38) with other data records in data sources 34, 36, 38 to identify data records which should be linked together. This identification process may entail a comparison of one or more of the attributes of the data records with like attributes of the other data records. For example, a name attribute associated with one record may be compared with the name of other data records, social security number may be compared with the social security number of another record, etc. In this manner, data records which should be linked may be identified.

It will be apparent to those of ordinary skill in the art, that both the data sources 34, 36, 38 and the operators 40, 42, 44 may be affiliated with similar or different organizations or owners. For example, data source 34 may be affiliated with a hospital in Los Angeles run by one health care network, while data source 36 may be affiliated with a hospital in New York run by another health care network. Thus, the data records of each of data sources may be of a different format.

This may be illustrated more clearly with reference to FIGS. 2A and 2B, depicting two embodiments of example data records. Each of these data records 200, 202 has a set of fields 210 corresponding to a set of attributes of each of the data records. For example, one of the attributes of each of the records 200 may be a name, another attribute may be a social security number, birth date, gender, etc. It will be apparent that an attribute may comprise multiple fields 210 of a data record 200, 202, for example, the name attribute of data record 200 may comprise fields 210$a$, 210$b$ and 210$c$, the last, middle and first name fields, respectively.

Notice, however, that each of the records may have a different format, for example data record 202 may have a field for an attribute, while data record 200 may have no such field. Similarly, like attributes may have different formats as well. For example, name fields 210$a$, 210$b$ 210$c$ in record 200 may accept the entry of a full first, last and middle name, while name fields 210$d$, 210$e$, 210$f$ in record 202 may be designed for full first and last names, but only allow the entry of a middle initial.

As may be imagined, discrepancies such as this may be problematic when comparing two or more data records (e.g., attributes of data records) to identify data records which should be linked. Complicating the connecting of data records, information pertaining to the same entity may be incorrectly entered into a data record, or may change in one data record pertaining to the entity but not in another data record, etc.

To deal with these possibilities, a system may be utilized which compares the various attributes of data records according to statistical algorithms to determine if data records refer to identical entities and hence, should be linked. More particularly, in one embodiment, the system may standardize data records in an incoming format (also known as the core data model, which may be different for new or incoming data records) to a standard format through the standardization of the attributes of the new or incoming data record. Using the standard format (also referred to as a derived data model) candidates may be selected for further comparison based on a set of these attributes and candidate selection functions, and these candidates subjected to a further comparison using a set of attributes and a set of comparison functions. As the candidate selection and comparison processes are accomplished using a standard format (e.g., for the data record) and the attributes are themselves standardized, these processes may be made more efficient, and the set of candidate selection functions and comparison functions designed to operate on these standardized attributes, eliminating the need to accommodate multiple formats of data records or attributes.

Figure 3:
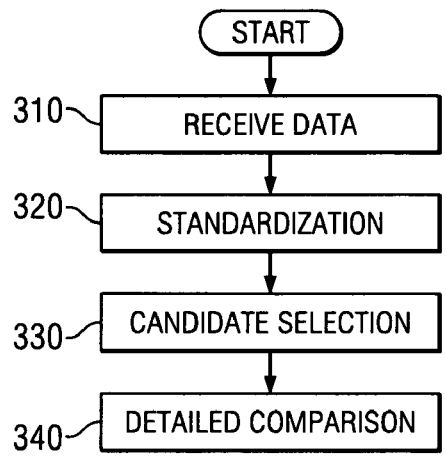
FIG. 3 depicts a flow diagram for one embodiment of comparing data records.

To aid in an understanding of the systems and methods of the present invention it will be helpful to present an example embodiment of a methodology for identifying records pertaining to the same entity which may utilize these systems and methods. FIG. 3 depicts one such embodiment, while other embodiments are depicted in U.S. Pat. No. 5,991,758 entitled "System and Method of Indexing Information About Entities From Different Information Sources," filed on Nov. 23, 1999, hereby incorporated by reference in its entirety. A set of data records for comparison may be given for evaluation at step

310. These data records may include, for example, one or more new or incoming data records to compare to a set of existing data records (which may already exist in, for example, data sources 34, 36, 38, MEI system 30, or which may be provided as well).

At step 320 these data records for comparison may be standardized if not already standardized. This standardization may comprise the standardization of attributes of a data record such that the data record is transformed from its original format to a standard format, such that subsequent comparisons between like attributes of different data records may be performed according to the standard format of both the attributes and the data record. It will be apparent that each of the attributes of the data records to be compared may be standardized according to a different format, a different set of semantics, lexicon, etc., and the standardization of each attribute into its corresponding standard form may be accomplished by a distinct function. Thus, each of the data records may be standardized into a standard format through the standardization of the various attributes of the data records, each attribute standardized by a corresponding function (these attribute standardization functions may, of course, be operable to standardize multiple types of attributes).

Once the attributes of the data records to be compared, and the data records themselves, have been standardized into a standard form at step 320, a set of candidates may be selected from the existing data records to compare to the new or incoming data record(s) at step 330. This candidate selection process (also known as bucketing) may comprise a comparison of one or more attributes of the new or incoming data records to the existing data records to determine which of the existing new data records are similar enough to the new data records to entail further comparison. Each set of candidates (bucket group) may be based on a comparison of each of a set of attributes between data records (e.g., between an incoming data record and an existing data records) using a candidate selection function (bucketing function) corresponding to the attribute. For example, one set of candidates may be selected based on a comparison of the name and address attributes using a candidate selection function designed to compare names and another to compare addresses.

The data records comprising these set(s) of candidates may then, at step 340, undergo a more detailed comparison to the new or oncoming records where a set of attributes are compared between the records to determine if an existing data record should be linked or associated with the new data record. This more detailed comparison may entail comparing one or more of the set of attributes of one record (e.g., an existing record) to the corresponding attribute in the other record (e.g., the new or incoming record) to generate a weight for that attribute. The weights for the set of attributes may then be summed to generate an overall weight which can then be compared to a threshold to determine if the two records should be linked.

As may be imagined from reading the above, a wide variety of variables, parameters or components may be used to guide the standardization of the attributes of data records into the standard format (e.g., the processing of the raw data format of an incoming or new data record to the standard format), the bucketing of sets of candidates based on the comparison of various attributes and the comparison of the sets of candidates with an incoming data record. For example, configuring a standardization function to be used to standardize each of the attributes, the set of attributes used to select a particular set of candidates and the bucketing function to be used to compare each of those attributes for the bucketing process, the comparison function to be used to compare the set of candidates to the incoming data record to create a score, etc.

In one embodiment, various parameters for the operation of such a methodology (e.g., a system for implementing an embodiment of the methodology) may be stored in a variety of tables at a data store associated with MEI system 30. Thus, the configuration of these various parameters may entail the manipulation of these tables such that the tables comprise the desired parameters and the system operates according to the desired configuration (a particular configuration for a system may also be referred to as an algorithm for the system).

The configuration of the tables (or any other data structures comprising configuration parameters) according to a desired algorithm may entail a significant degree of knowledge regarding the architecture of the system, the arrangement of the various tables, the types of functions (standardization, bucketing, comparison etc.) which the system has available for utilization, etc. Furthermore, manipulation of the tables (or other data structures) may require a certain amount of programming skill. In particular, in many instances, the manipulation of these tables is done through the composition of a set of configuration scripts, which when run result in the configuration of the tables according to a desired algorithm. Composing these scripts is not only a laborious, time intensive process, but is additionally highly prone to error as the scripts are long and require the manual entry of specific and abstract information (e.g., table numbers or slots). Consequently, the use of these scripts may result in configurations which will not work at all (e.g., configurations where the system cannot execute) or equally problematic, configurations the system may execute but which will yield incorrect or undesired results. Thus, what is desired is a straightforward way to configure a system for indexing or matching data records (e.g., configuring the tables or data structures of the system such that the system operates according to a desired algorithm), which may allow easy verification and validation of a particular algorithm.

To that end, attention is now directed to systems and methods for a graphical user interface for the configuration of a system for the association (e.g., matching or indexing) of data records, as described above. Embodiments of the invention provide a graphical interface for manipulating (e.g., creating, editing or otherwise altering) a representation of an algorithm for the configuration of such a system, including selecting attributes, standardization functions, bucketing functions and comparison functions; connecting the selected attributes with corresponding standardization functions; creating bucketing groups through the connecting of attributes and bucketing functions; the connecting of attributes and comparison function; etc. to configure the transformation of data records from their native format to a standard data format and subsequent candidate selection and matching according to the representation of the algorithm.

More specifically, embodiment of the graphical user interface may have access to a set of possible configuration components and parameters (e.g., algorithm components, configuration parameters for these components, etc.) which a system for the indexing or matching of data records may be configured to utilize, and present representations of these configuration components or parameters to a user such that a user can select from among the presented configuration components or designate parameters to create a representation of a configuration algorithm for the system. The graphical user interface may then allow a system for the matching or indexing of data records to be configured according to the representation of the algorithm created with the graphical user interface.

Thus, embodiments of the methods and systems of the present invention may provide certain distinct advantages with regards to configuring systems for matching or indexing data records. Specifically, the use of embodiments of the present invention may allow visualization of the complete set of algorithms to review completeness (e.g. that all intended attributes fully configured) and validation of the algorithm via a set of configurable validation rules (e.g. attribute types match standardization, buckets defined, etc.). Furthermore, saved configurations may provide templates for implementations of similar algorithms, and these saved configurations may provide a moveable artifact from system to system. In fact, embodiments of the present invention may be used as a learning tool to familiarize a user with the configuration and capabilities of the algorithms and associated matching or indexing systems.

Figure 4:
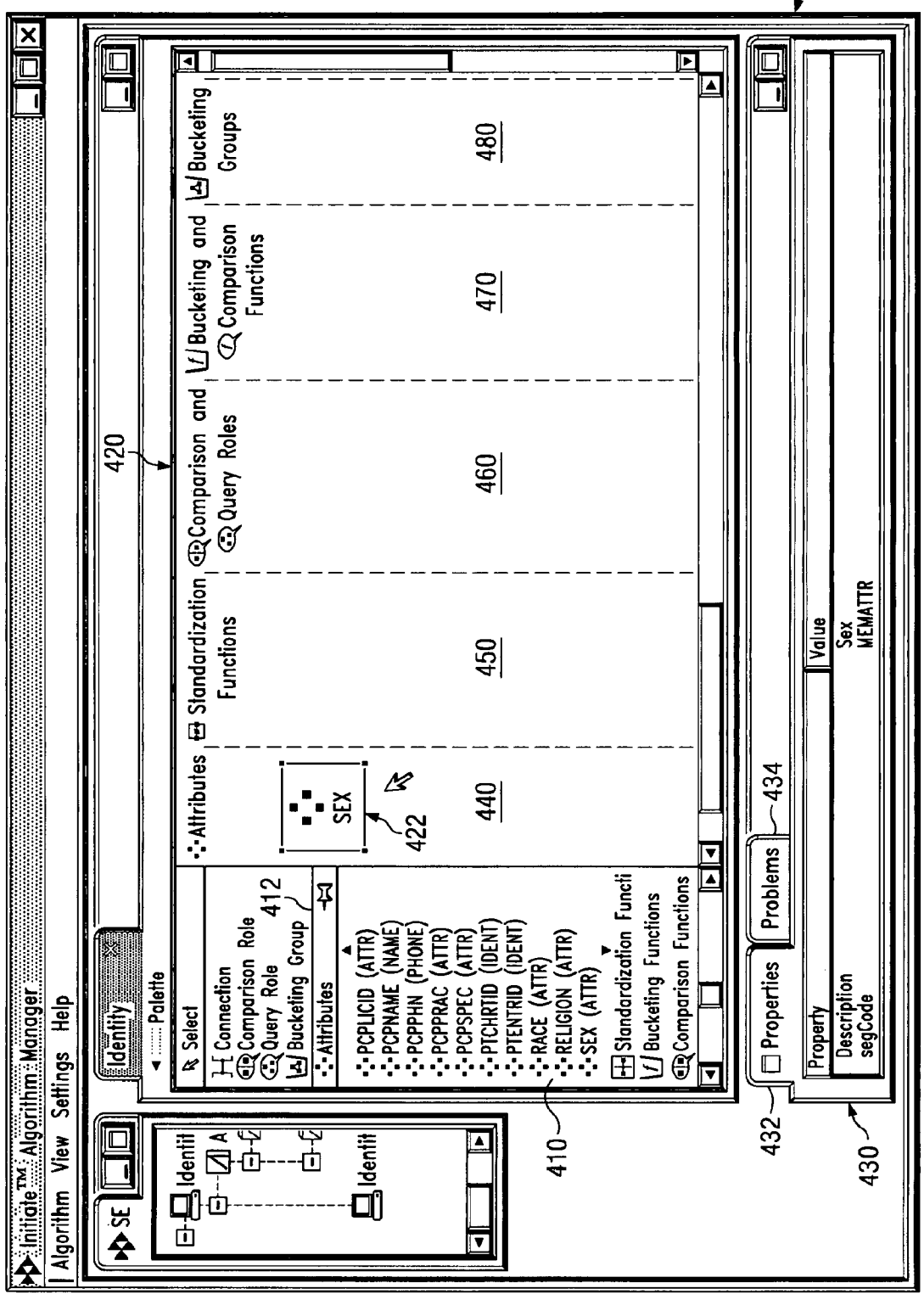
FIGS. 4-32 depict one embodiment of a user interface for the configuration of a system for associating data records.

Turning now to FIGS. 4-21 various steps in the creation of an algorithm for configuring a system for indexing or matching data records using one embodiment of a graphical interface are depicted. Referring first to FIG. 4, one embodiment of a graphical user interface for the configuration of a system for the matching or indexing of data records and may be part of, or execute separately from, such a system. Interface 400 may communicate with a system for indexing or matching data records (e.g., using a set of application programming interfaces) to obtain the current configuration of the tables (or other data structures) of the system and display a representation of the current configuration of the system in algorithm window 420. Alternatively, interface 400 may load a saved representation of an algorithm or algorithm template from a file or allow a user to create a new representation of an algorithm. Using interface 400, a user may then create, edit or otherwise manipulate the representation of the algorithm.

Graphical user interface 400 may have palette 410 allowing various components for the representation of the algorithm to be selected, algorithm window 420 displaying a current state of an algorithm representation and information window 430 which may display information on properties of the current state of the representation of the algorithm or a particular component of the current state of the representation of the algorithm or may display potential problems of the current state of the representation of the algorithm or a particular component, depending on the tab 432, 434 selected.

Algorithm window 420 may be divided into five areas, which may in one embodiment be columns of algorithm window 420; namely attribute column 440, standardization function column 450, comparison and query role column 460, bucketing and comparison function column 470 and bucketing group column 480. Attribute column 440 may be for representing attributes of data records (e.g., attributes of data records in their native data format), standardization function column 450 may be for placement of representation of standardization functions for the transformation of attributes of data records to a standard format. Comparison and query role column 460 may be for representation of indices or locations in a standard format, bucketing group column 480 may be for representation of bucketing groups, while bucketing and comparison function column 470 may be for representation of bucketing and comparison functions for the comparisons of attributes to create bucketing groups and match data records. Palette 410 may allow a user to select from representations of a set of algorithm components, such that these representations of algorithm components may be placed in algorithm window to update the current state of the algorithm representation displayed in algorithm window 420. In one embodiment, the attributes, functions, etc. represented in palette 410 may be retrieved from a system for the indexing or matching of data records and represent the attributes, functions, etc. which the system may be operable to utilize. Thus, by selecting components from palette 410, placing them in algorithm window 420, configuring parameters of these components using interface 400 and connecting the components in algorithm window, a representation for a desired algorithm for operation of a system for the indexing or matching of data records may be configured, including how such a system transforms data records from a native format to a standard format and the creation and comparison of sets of candidates using the standard format.

For example, palette 410 may allow a user to select from a group of attributes. Specifically, in one embodiment, by clicking on attributes button 412 the set of attributes which a system may be configured to utilize is presented to the user. The user may select one of the attributes to add to the current state of the algorithm representation. Here, a user has selected the "SEX" attribute from the set of attributes presented in palette 410 and added a representation of this attribute to the current state of the algorithm representation in attribute column 440 (which may be done by dragging and dropping, selecting and clicking or almost any other means known in the art). The attribute "SEX" is represented by attribute icon 422 in attribute column 440 of algorithm window 420. Note that when attribute icon 422 is highlighted (e.g., during selection, placement or thereafter) properties associated with the "SEX" attribute may be displayed in information window 430.

Figure 5:
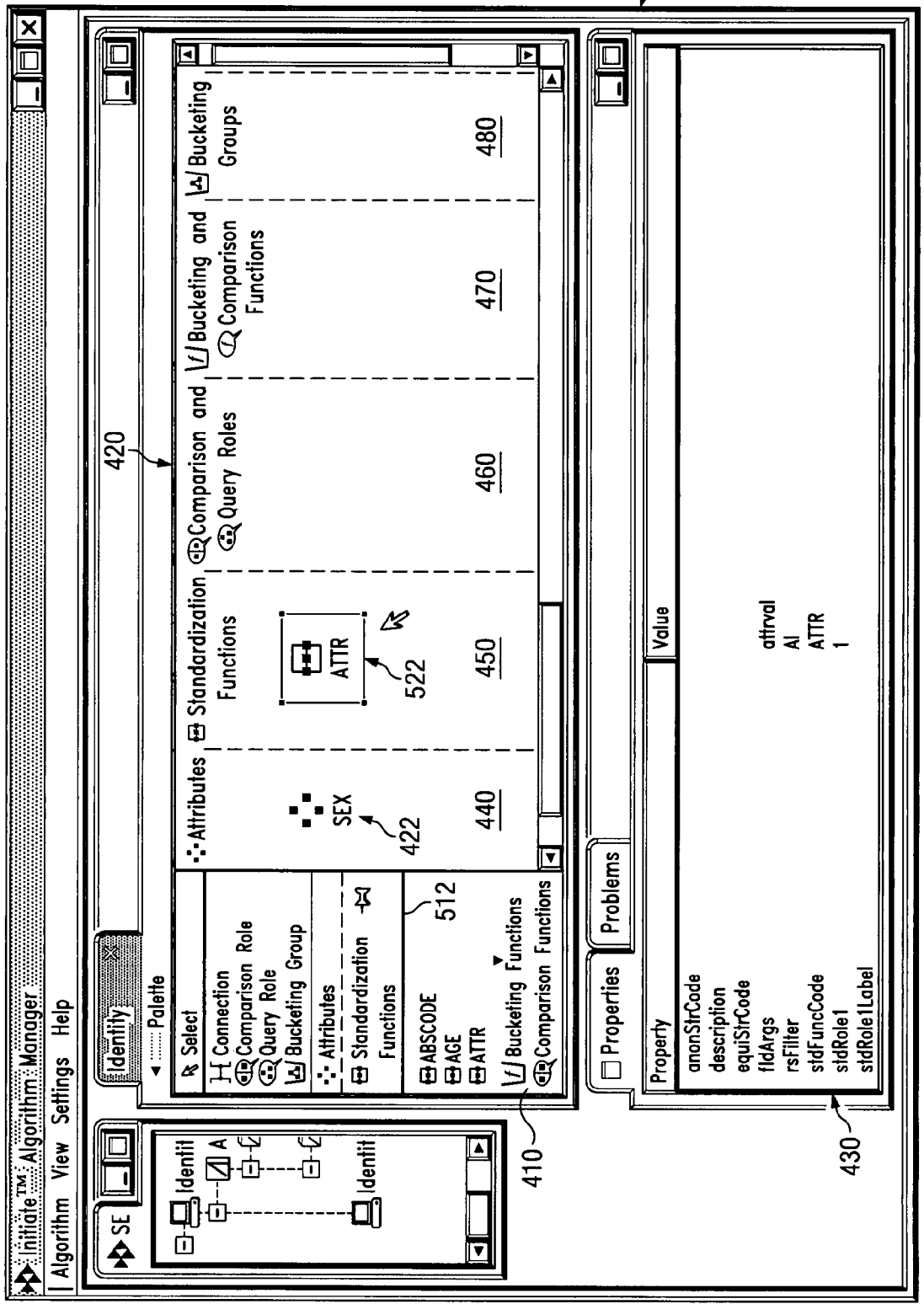

FIG. 5 depicts adding a representation of a standardization function to the current state of the representation of the algorithm using one embodiment of a graphical user interface. By clicking on standardization functions button 512 the set of standardization functions which a system may be configured to utilize is presented to the user. The user may select one of the standardization functions to add to the current state of the algorithm representation. Here, a user has selected the "ATTR" standardization function from the set of standardization functions presented in palette 410 and added a representation of the standardization function to the current state of the algorithm representation in standardization function column 450. The standardization function "ATTR" is represented by standardization function icon 522 in standardization function column 450 of algorithm window 420. Note that when standardization function icon 522 is highlighted properties or configuration parameter associated with the "ATTR" standardization function may be displayed in information window 430.

Figure 6:
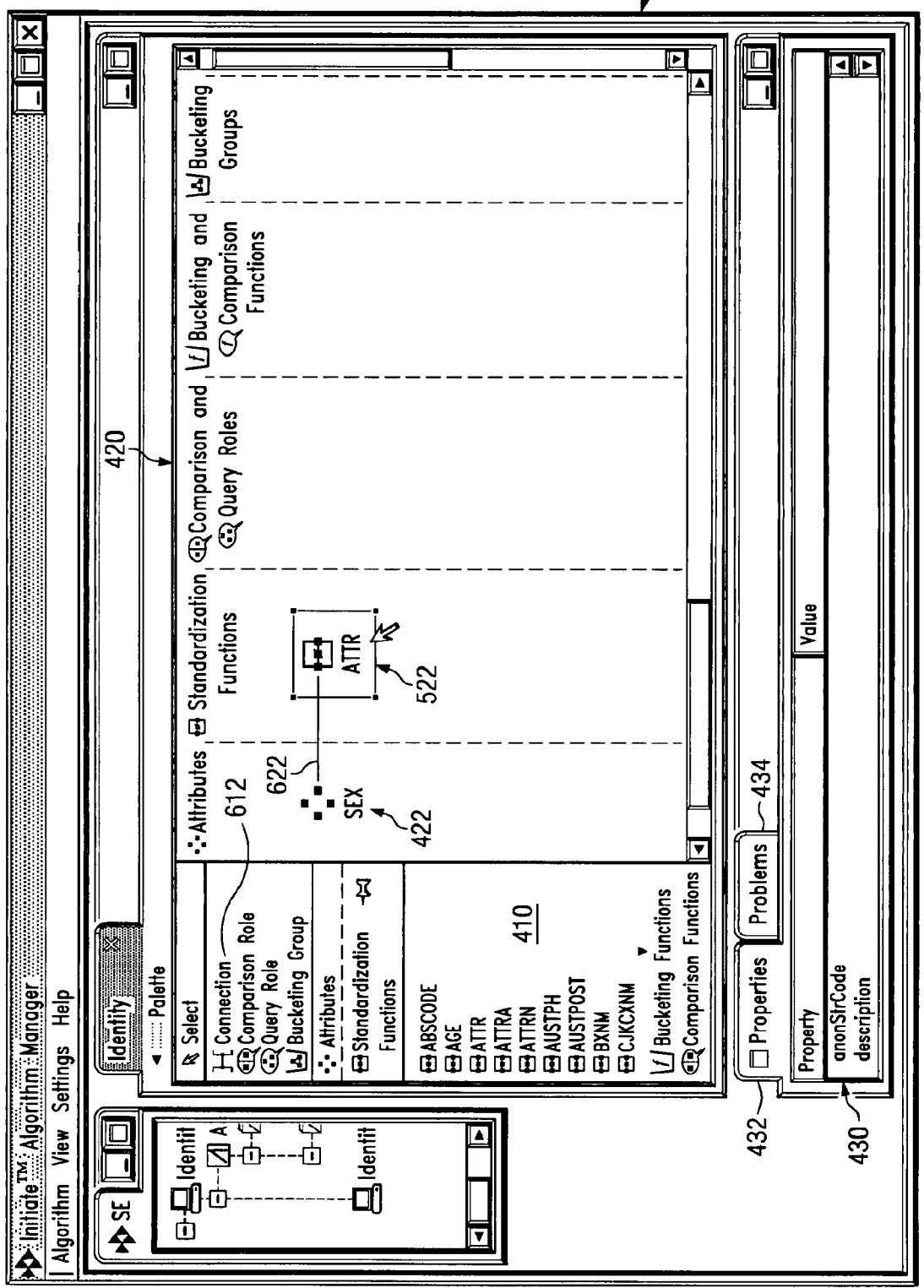

Moving on to FIG. 6 a representation of connecting an attribute icon with a standardization function icon in the current state of the representation of the algorithm using one embodiment of a graphical user interface is depicted. By clicking on connection button 612 a connection icon may be placed in algorithm window 420 to create a connection between other icons in the current state of the representation of the algorithm. This connection may represent a correspondence or association between components represented by icons in algorithm window 420. Here, a user has used connection icon 622 to create a connection between "SEX" attribute icon 422 and "ATTR" standardization function icon 522, representing that the "SEX" attribute should be standardized with the "ATTR" standardization function in a configuration of a system resulting from the representation of the algorithm depicted in algorithm window 420.

Figure 7:
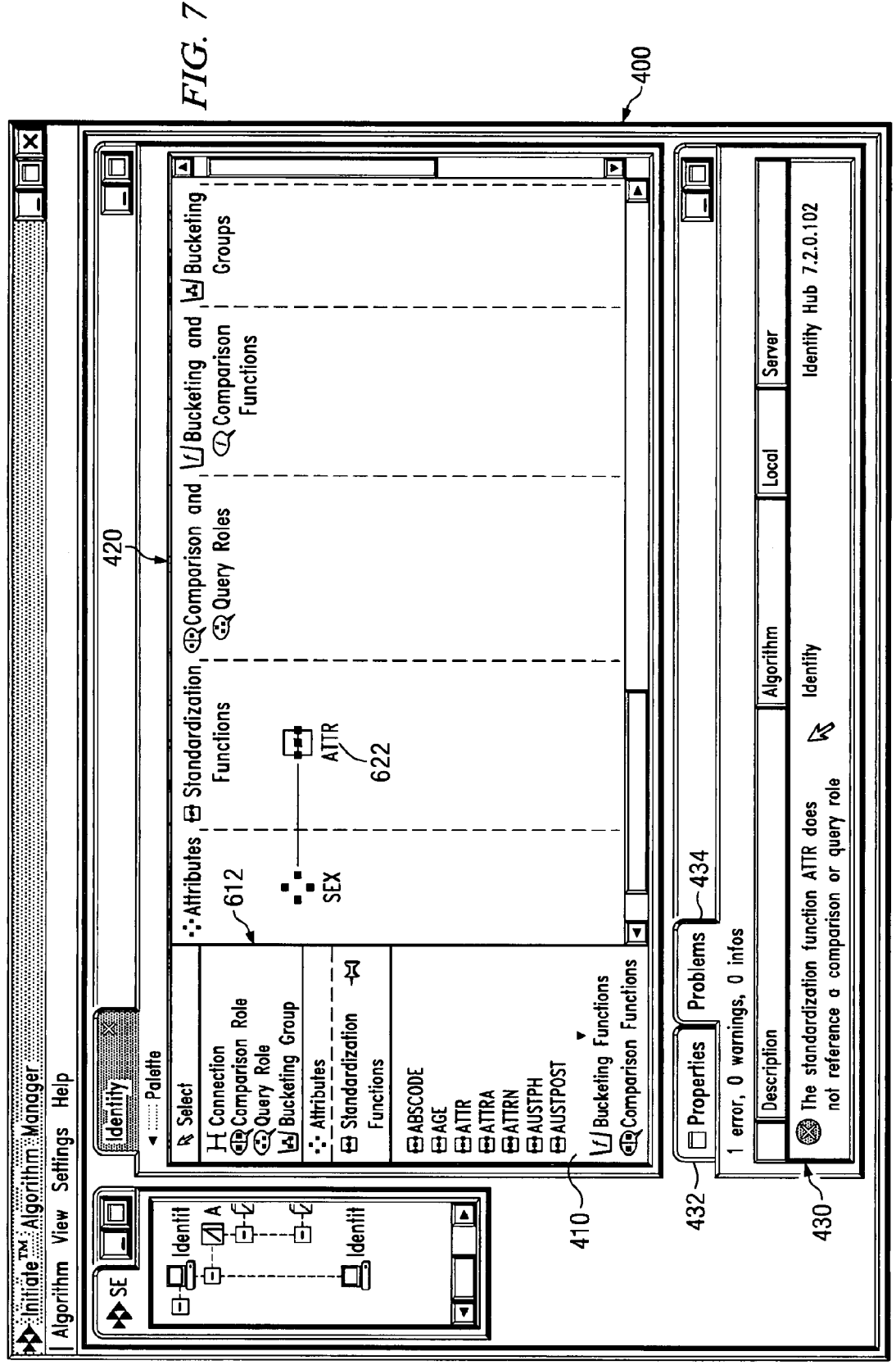

Referring to FIG. 7, the notification of a problem with the current state of the representation of the algorithm is depicted. As the current state of the representation of the algorithm in algorithm window 420 is updated problems with the current state of the representation may be reported to a user through information window 430. In this example, interface 400 is notifying a user that in the current state of the representation of the algorithm the "ATTR" standardization function (e.g., represented by standardization icon 622) is not associated with a comparison or query role, which may be desired for the proper function of the system if it is configured according to the representation of the algorithm in algorithm window 420. In one embodiment, if a problem is detected in the current state of the representation of the algorithm depicted in algorithm window 420, problem tab 434 may automatically be made active such that the problem may be displayed to a user.

Figure 8:
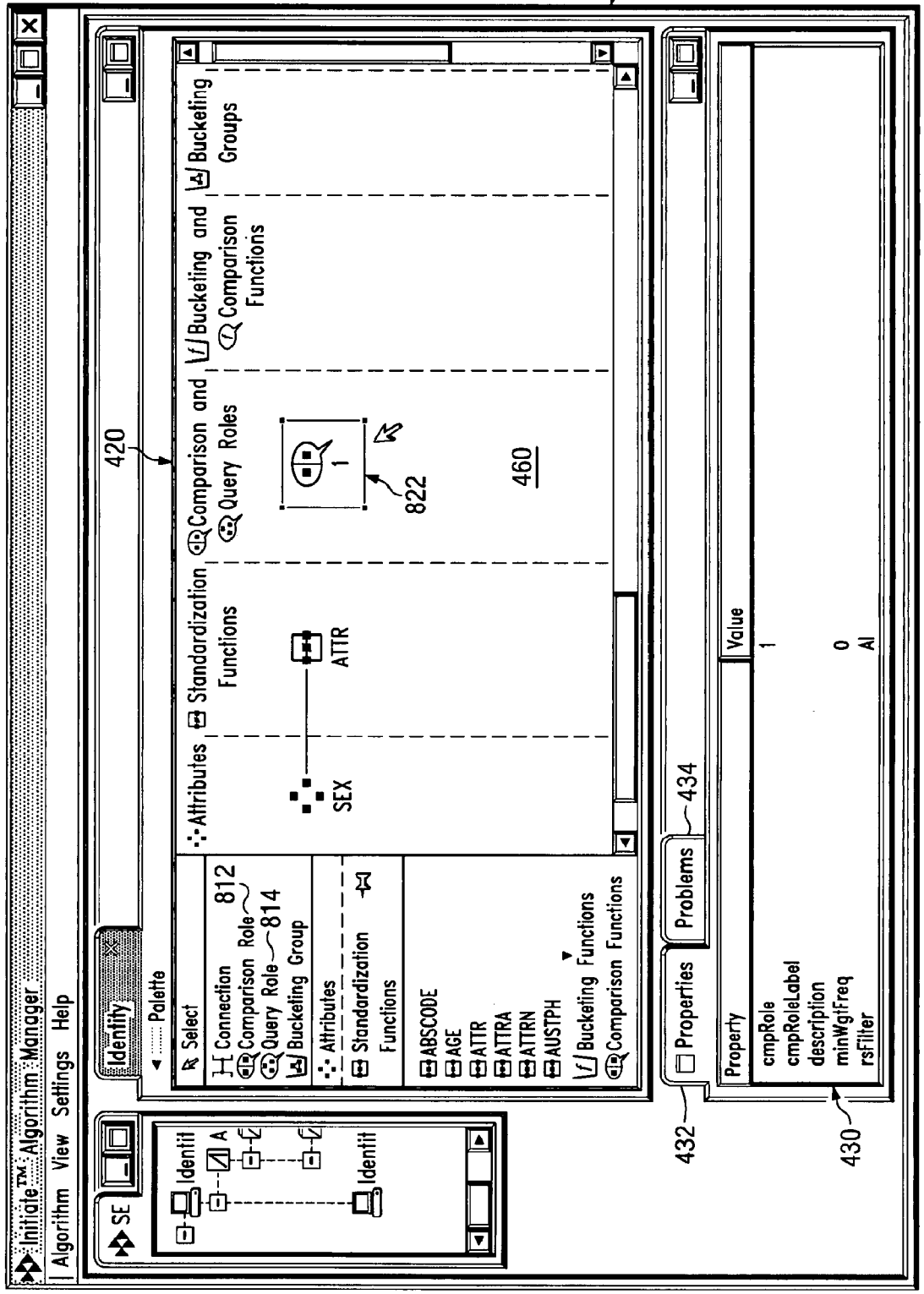

In FIG. 8, a representation of adding a representation of a comparison role or query role, respectively, to the current state of the representation of the algorithm is depicted. By clicking on comparison role button 812 or query role button 814 a user may add a representation of a comparison role or query role to the representation of the algorithm depicted in algorithm window 420. A representation of a comparisons or query role may represent a location in the standardized data format used by the system for indexing or matching data records. Here, a user has added a representation of a comparison role to the current state of the algorithm representation in comparison and query role column 460. The comparison role "1" is represented by comparison role icon 822 in comparison and query role column 460 of algorithm window 420. Note that when comparison role icon 822 is highlighted properties or configuration parameters associated with comparison role "1" may be displayed in information window 430.

Figure 9:
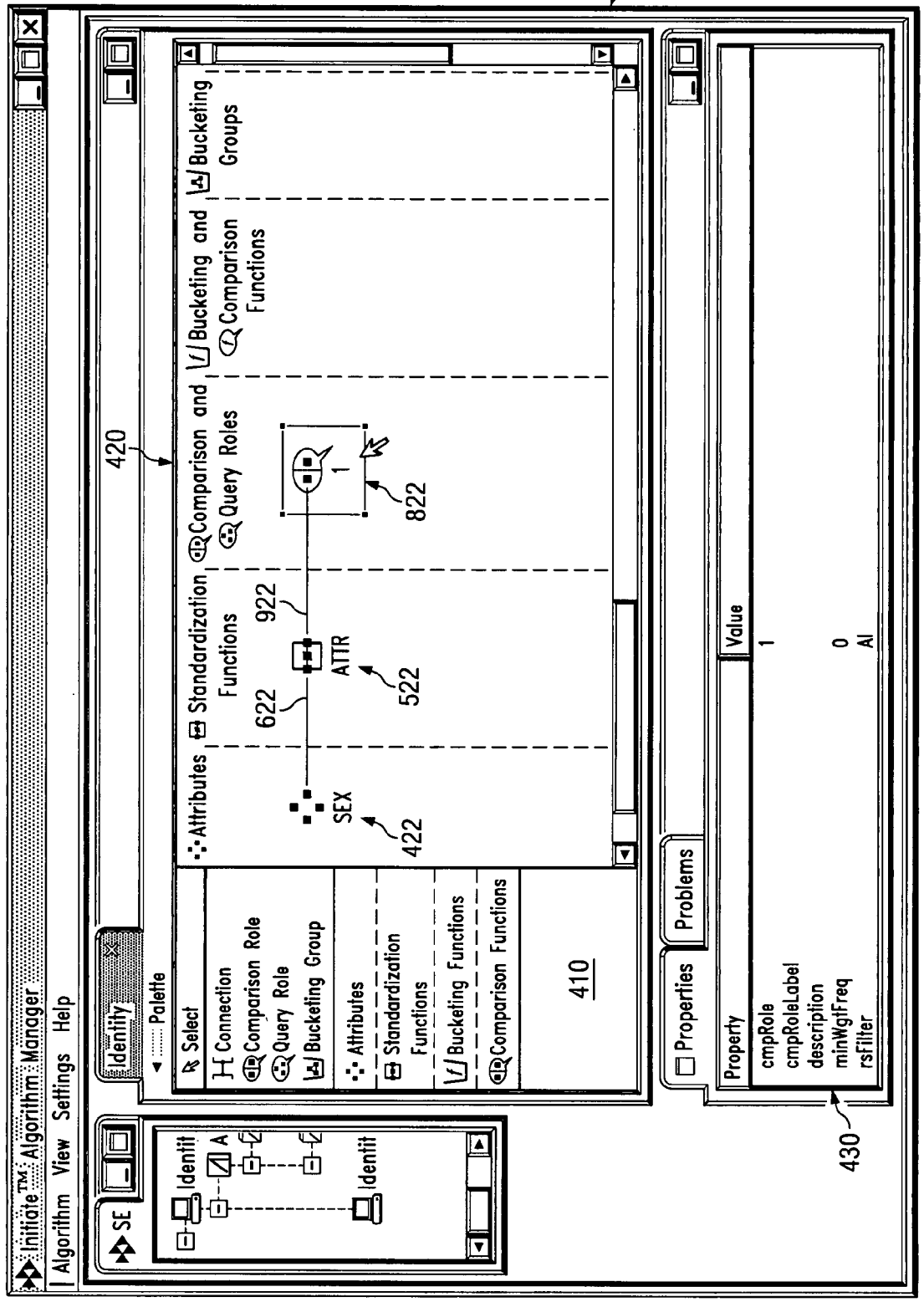

FIG. 9 represents the connecting of a standardization function icon with a comparison role icon in the current state of the representation of the algorithm using one embodiment of a graphical user interface is depicted. Here, a user has used connection icon 922 to create a connection between "ATTR" standardization function icon 522 and "1" comparison role icon 822, representing that the outcome of the instance of the "ATTR" standardization function represented by standardization function icon 522 should be stored in a first location of a standard data format represented by comparison role icon 822 in a configuration of a system resulting from the representation of the algorithm depicted in algorithm window 420.

Figure 10:
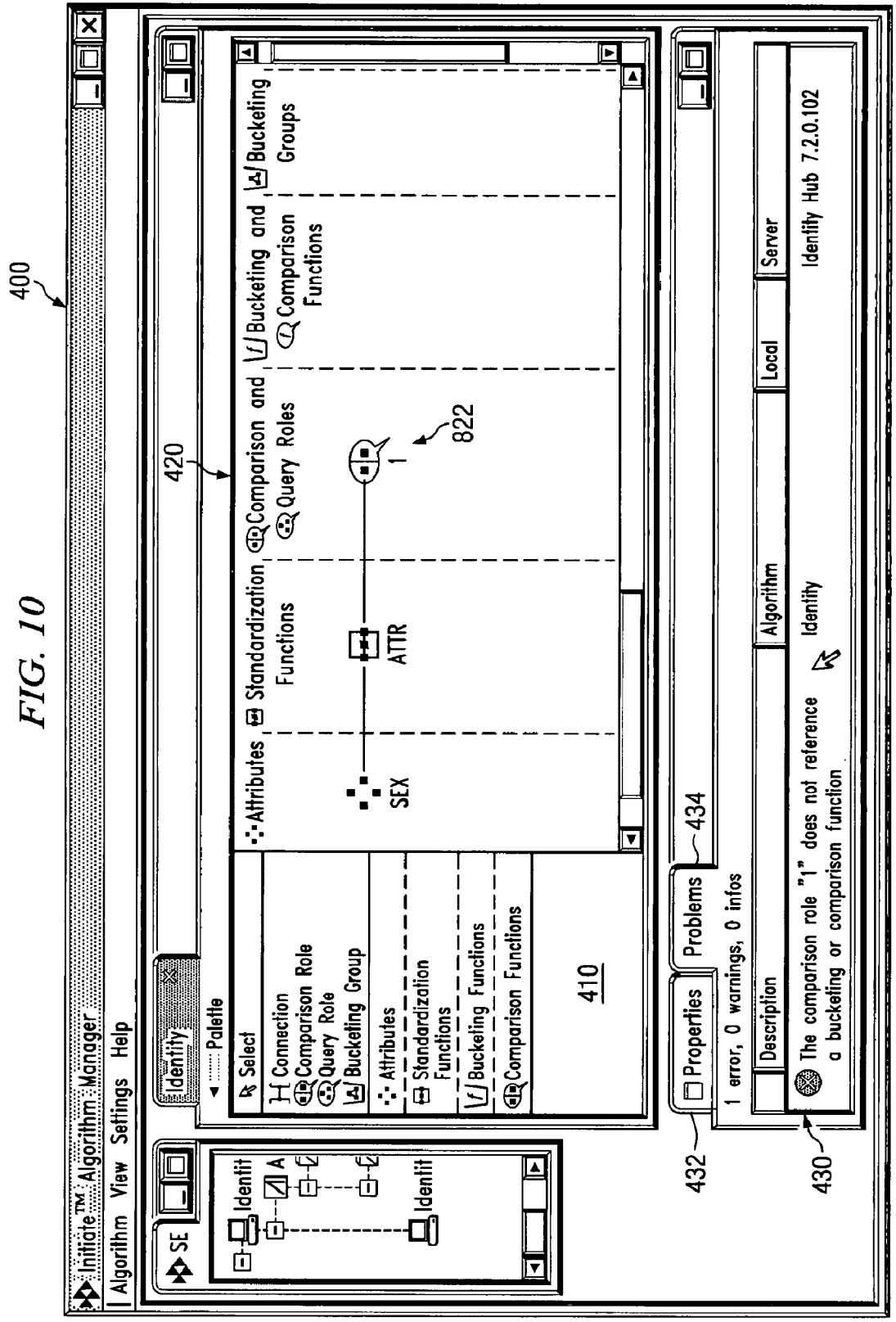

Referring to FIG. 10, the notification of a problem with the current state of the representation of the algorithm by one embodiment of a graphical user interface is depicted. In this example, interface 400 is notifying a user the current state of the representation of the algorithm the "1" comparison role (e.g. represented by comparison role icon 822) is not associated with a bucketing or comparison function, which may be desired for the proper function of the system if it is configured according to the representation of the algorithm in algorithm window 420.

Figure 11:
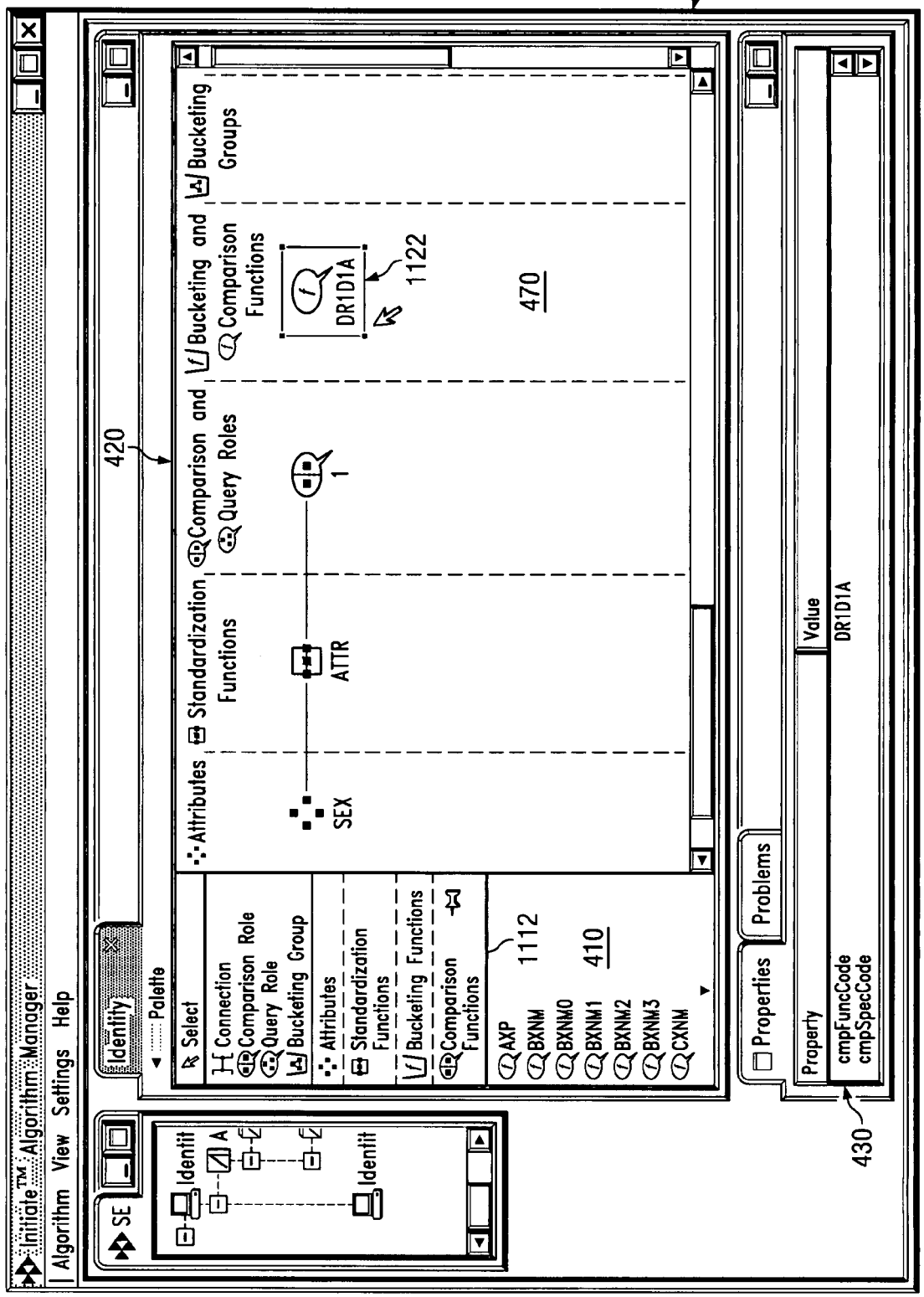

FIG. 11 depicts adding a representation of just such a comparison function to the current state of the representation of the algorithm using one embodiment of a graphical user interface. By clicking on comparison functions button 1112 the set of comparison functions which a system may be configured to utilize is presented to the user. The user may select one of the comparison functions to add to the current state of the algorithm representation. Here, a user has selected the "DR1D1A" comparison function from the set of comparison functions presented in palette 410 and added a representation of the comparison function to the current state of the algorithm representation in bucketing and comparison function column 470. The comparison function "DR1D1A" is represented by comparison function icon 1122 in bucketing and comparison function column 470 of algorithm window 420. Note that when comparison function icon 1122 is highlighted, properties or configuration parameters associated with the "DR1D1A" comparison function may be displayed in information window 430.

Figure 12:
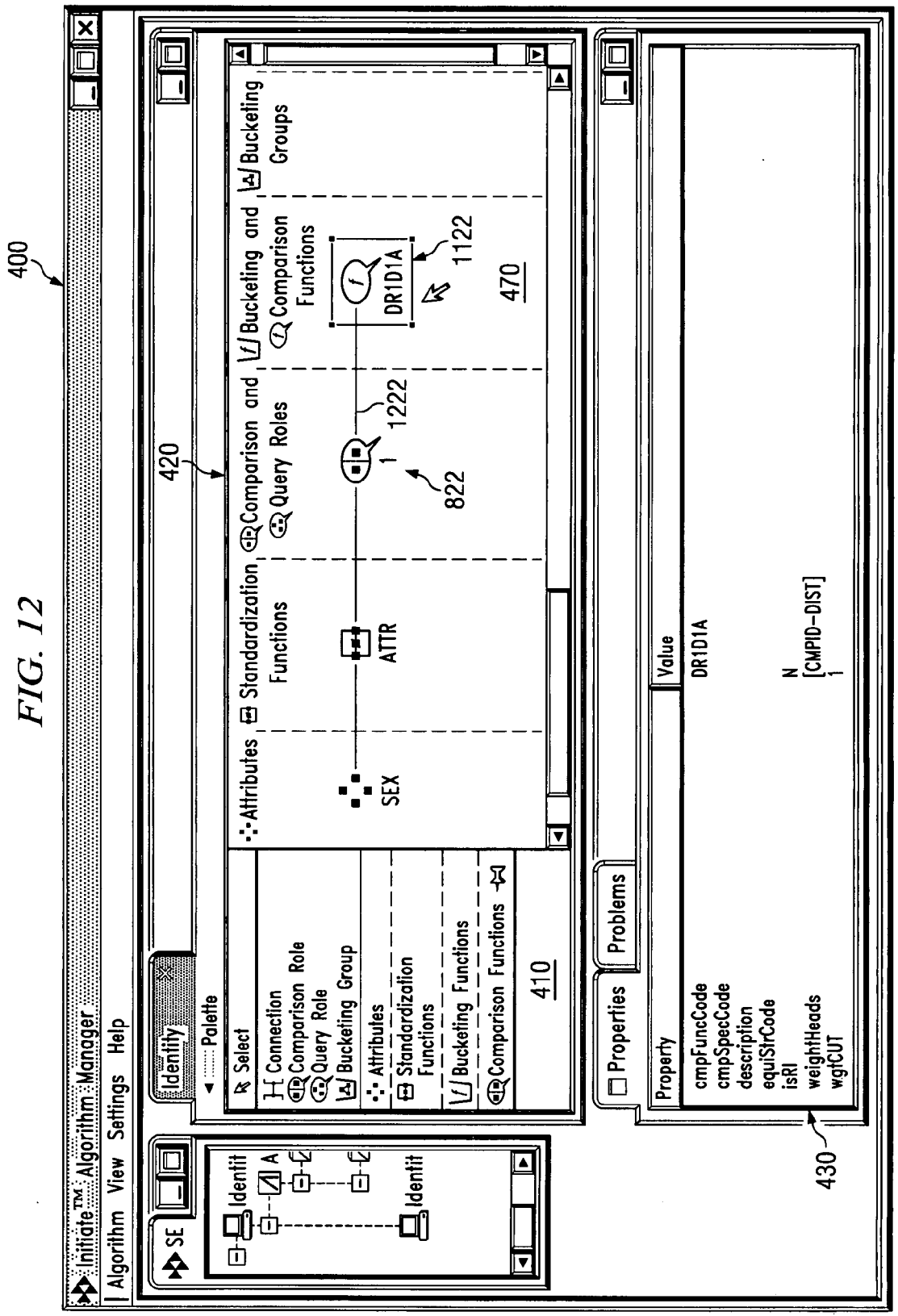

FIG. 12 depicts the connecting of a comparison role icon with a comparison function icon in the current state of the representation of the algorithm using one embodiment of a graphical user interface. Here, a user has used connection icon 1222 to create a connection between "1" comparison role icon 822 and "DR1D1A" comparison function icon 1122, represented by data in comparison role "1" represented by comparison role icon 822 (e.g., the standardization of the "SEX" attribute represented by "SEX" attribute icon 422 as standardized by standardization function "ATTR" represented by standardization function icon 522) should be compared using the "DR1D1A" comparison function represented by comparison function icon 1122. In other words in a system configured according to the algorithm represented in algorithm window 420, during comparisons of candidate data records (e.g., step 340 above), the standardized "SEX" attribute stored in location of 1 of each data record being compared may be compared using the "DR1D1A" comparison function.

As discussed above, interface 400 may present the user with problems in the current state of the algorithm represented in algorithm window 420. These problems may include validation problems (e.g., the system cannot be configured according to the represented algorithm, the current representation of the algorithm will result in incorrect operation of the system if the system is configured accordingly, more information is needed with respect to components represented in the current representation of the algorithm in order for the current configuration of the algorithm to be utilizable by the system, etc.). In addition to presenting validity problems with a current state of the representation of an algorithm, interface 400 may also present means (e.g., windows, prompts, etc.) by which such needed information may be supplied by the user and the current state of the algorithm rendered valid.

Figure 13A:
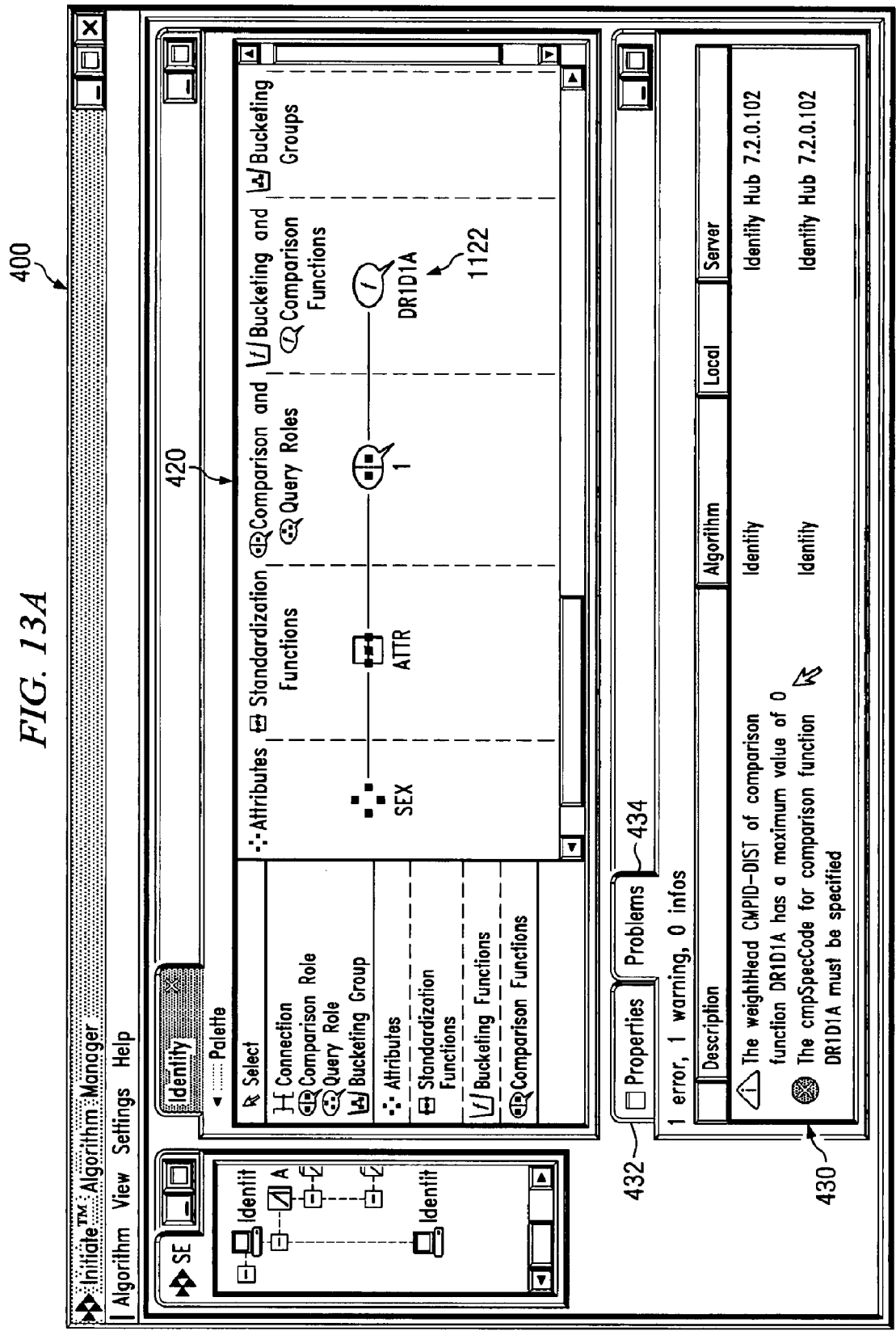
Figure 13B:
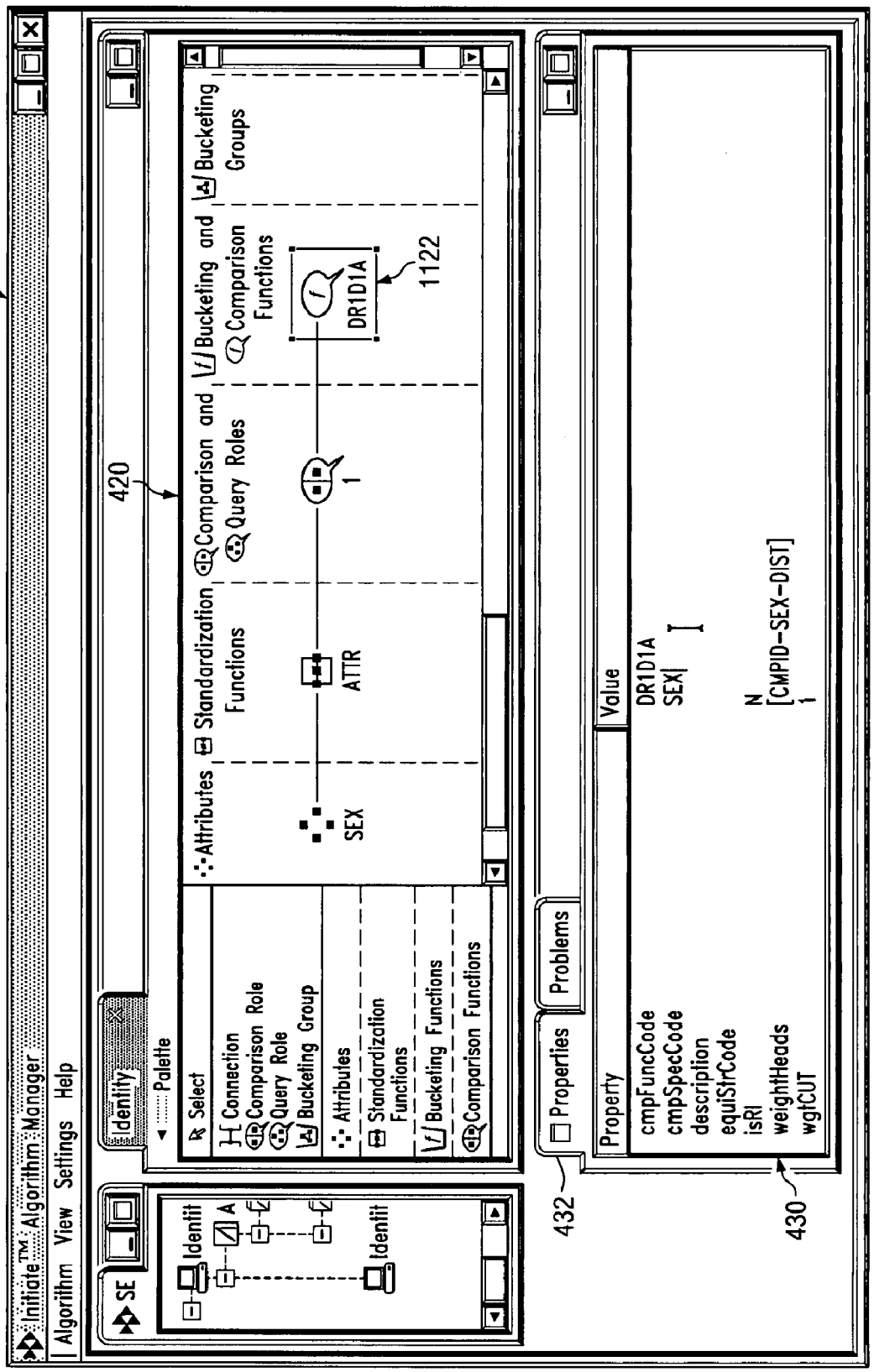
Figure 13C:
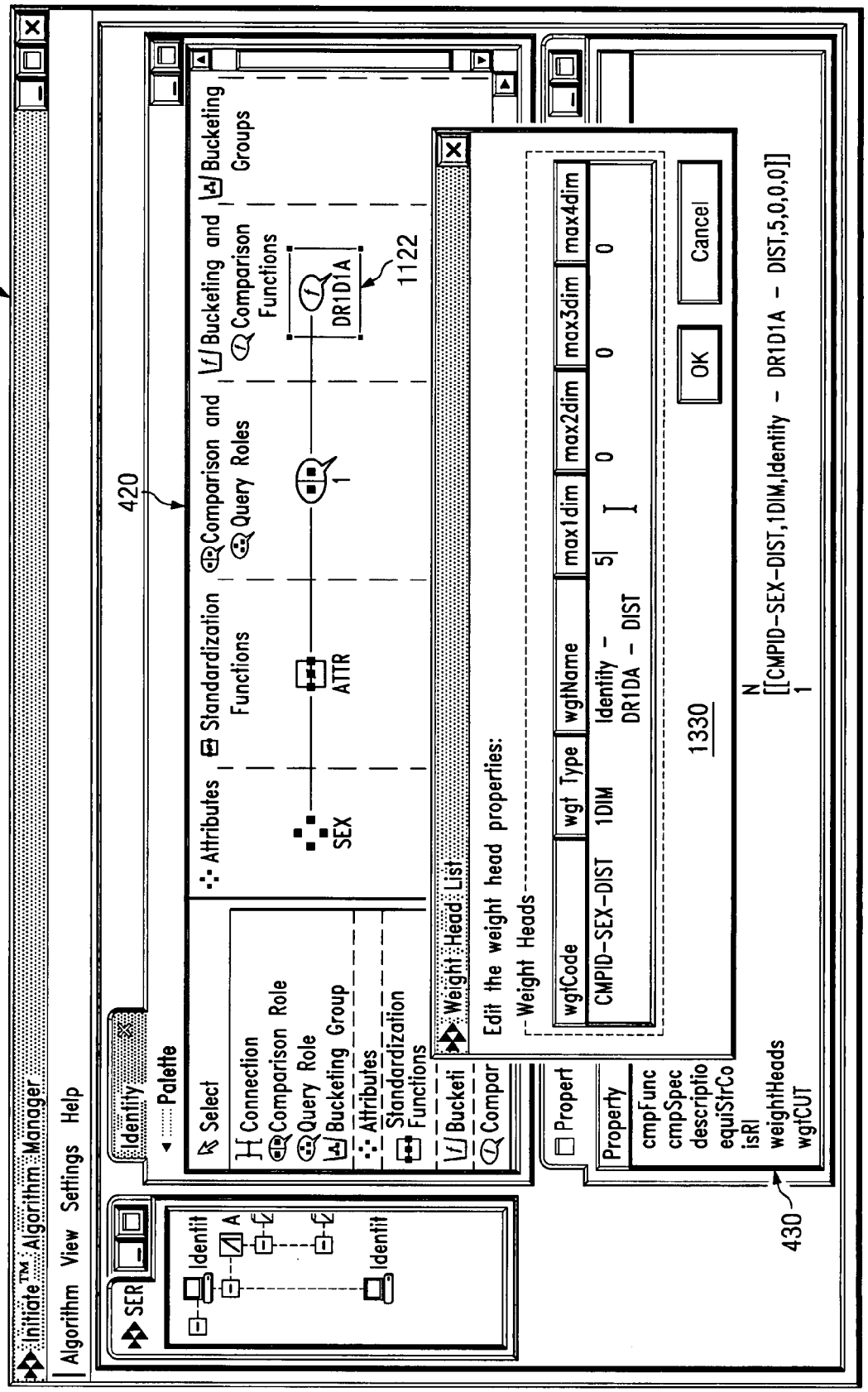

Examples of these types of actions are presented in FIGS. 13A-C, depicting the presentation of validity problems with a current state of the representation of an algorithm and the presentation by interface 400 of window 1330 for the entry of data by user such that the algorithm represented in algorithm window 420 may be put in a valid state. More particularly, problems may be presented and corrected in information window 430 or window 1330 by interface 400 to allow a user to enter configuration information associated with the "DR1D1A" comparison function represented by comparison function icon 1122.

Figure 14:
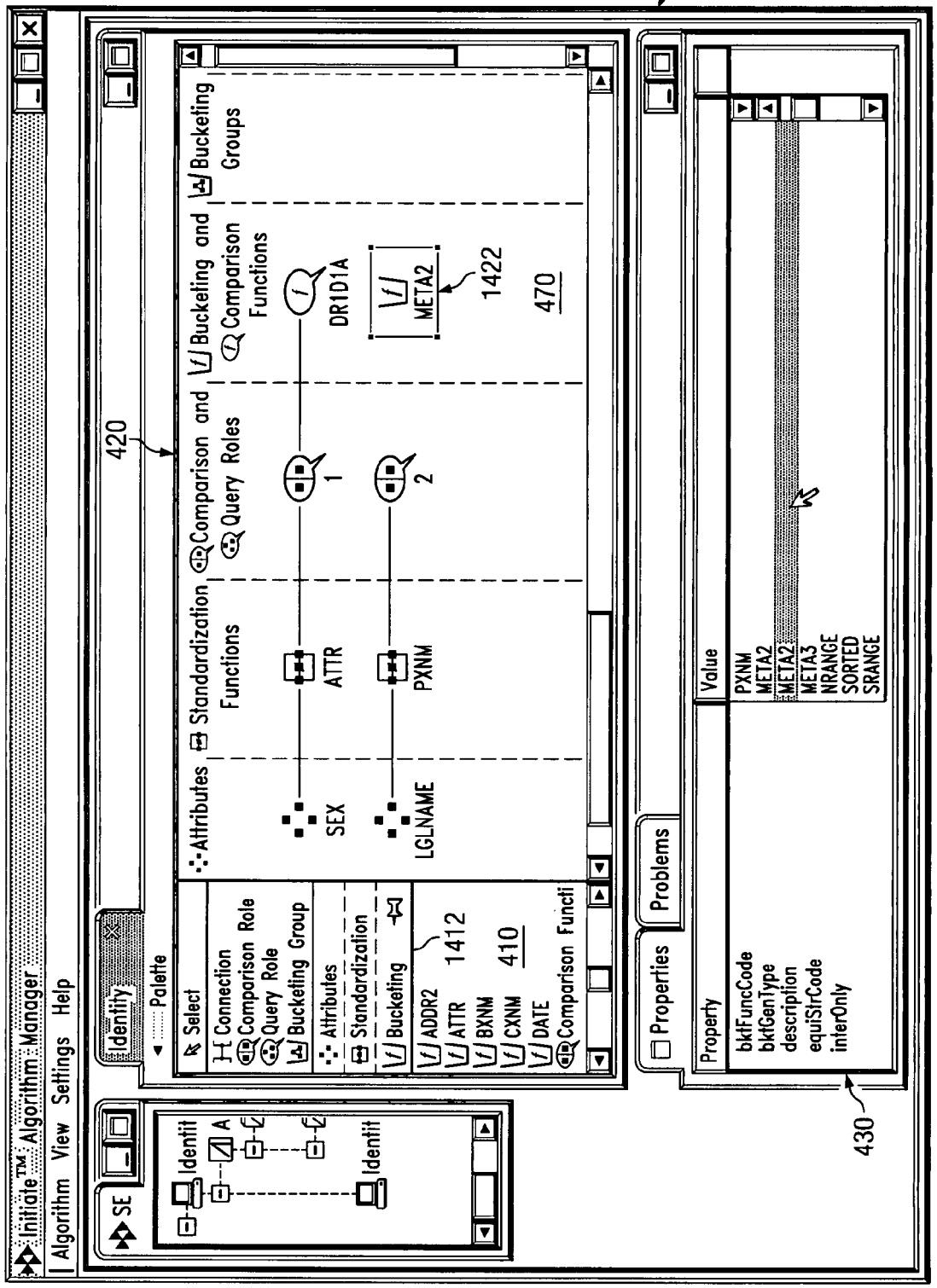

Moving now to FIG. 14, adding a representation of a bucketing function to the current state of the representation of the algorithm using one embodiment of a graphical user interface is depicted. By clicking on bucketing function button 1412 the set of bucketing functions which a system may be configured to utilize is presented to the user. The user may select one of the bucketing functions to add to the current state of the algorithm representation. Here, a user has selected the "PXNM" bucketing function from the set of bucketing functions presented in palette 410 and added a representation of the bucketing function to the current state of the algorithm representation in bucketing and comparison function column 470. The bucketing function is represented by bucketing function icon 1422 in bucketing and comparison function column 470 of algorithm window 420. In addition, with selection of a bucketing function, information window 430 may prompt the user to select a generation type for the selected bucketing function which determines how the bucketing function performs. In this case the generation type "META2" has been selected for the bucketing function represented by "PXNM" bucketing function icon 1422 (and is labeled as such).

Figure 15:
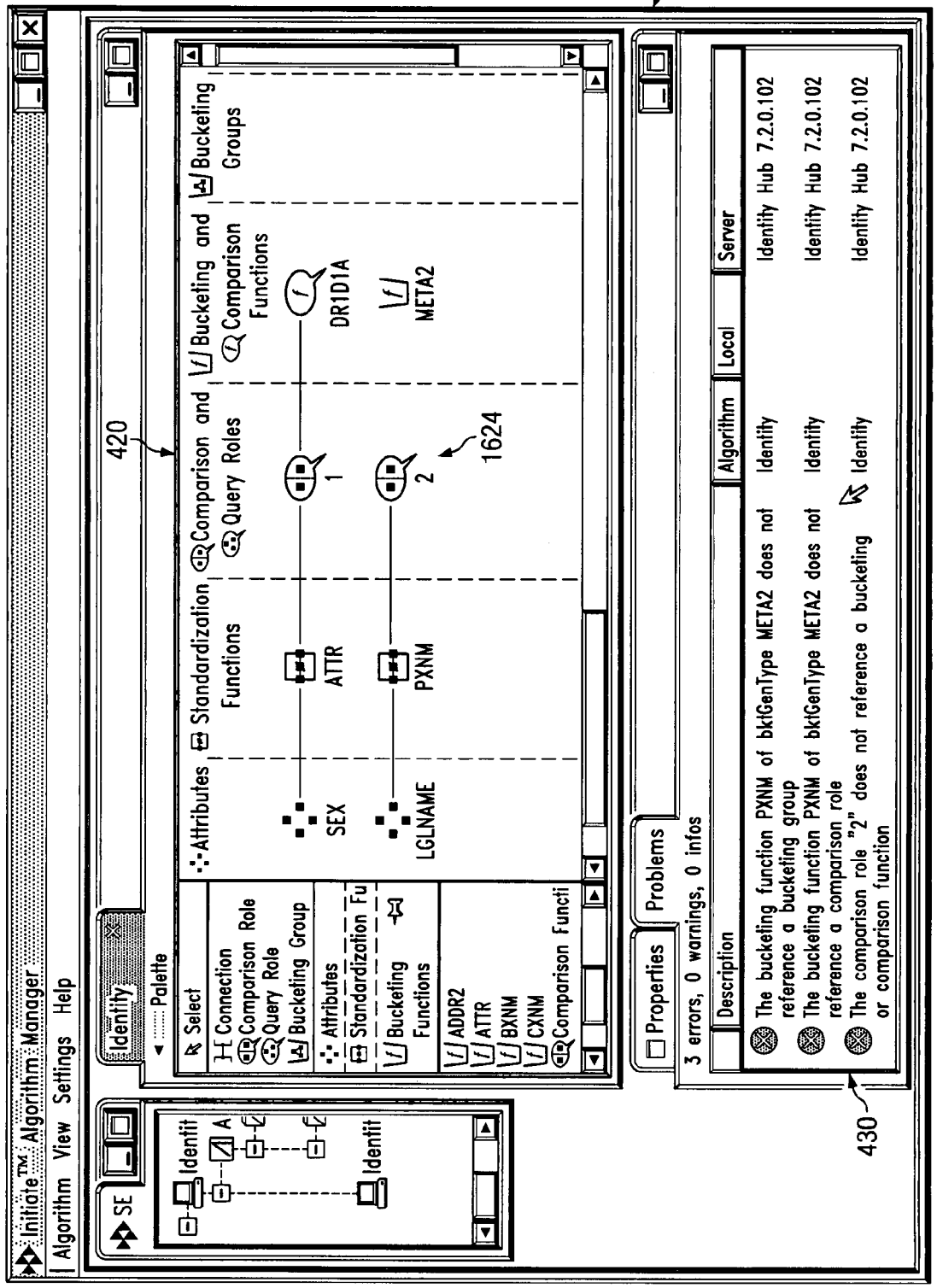
Figure 16:
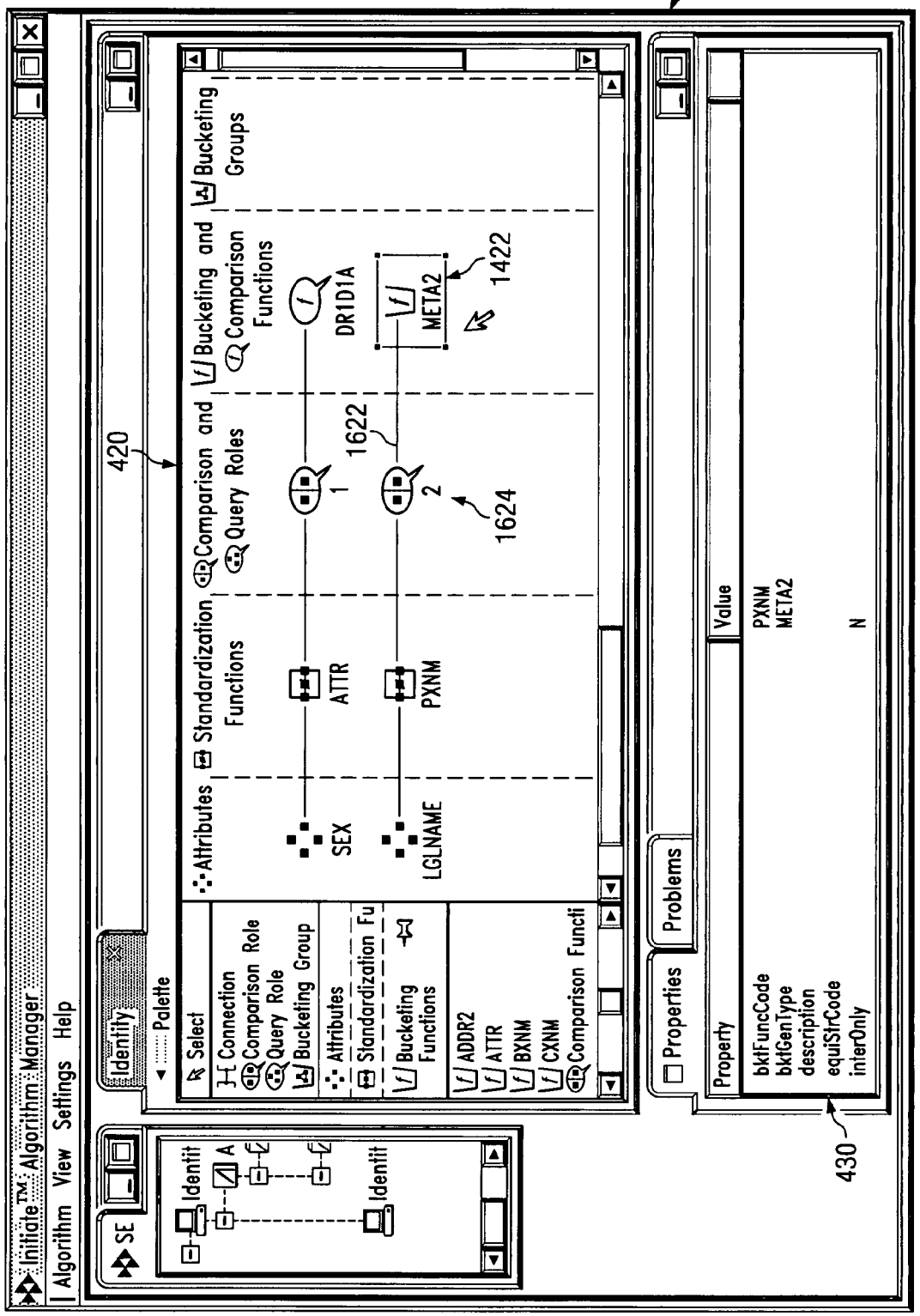
Figure 17:
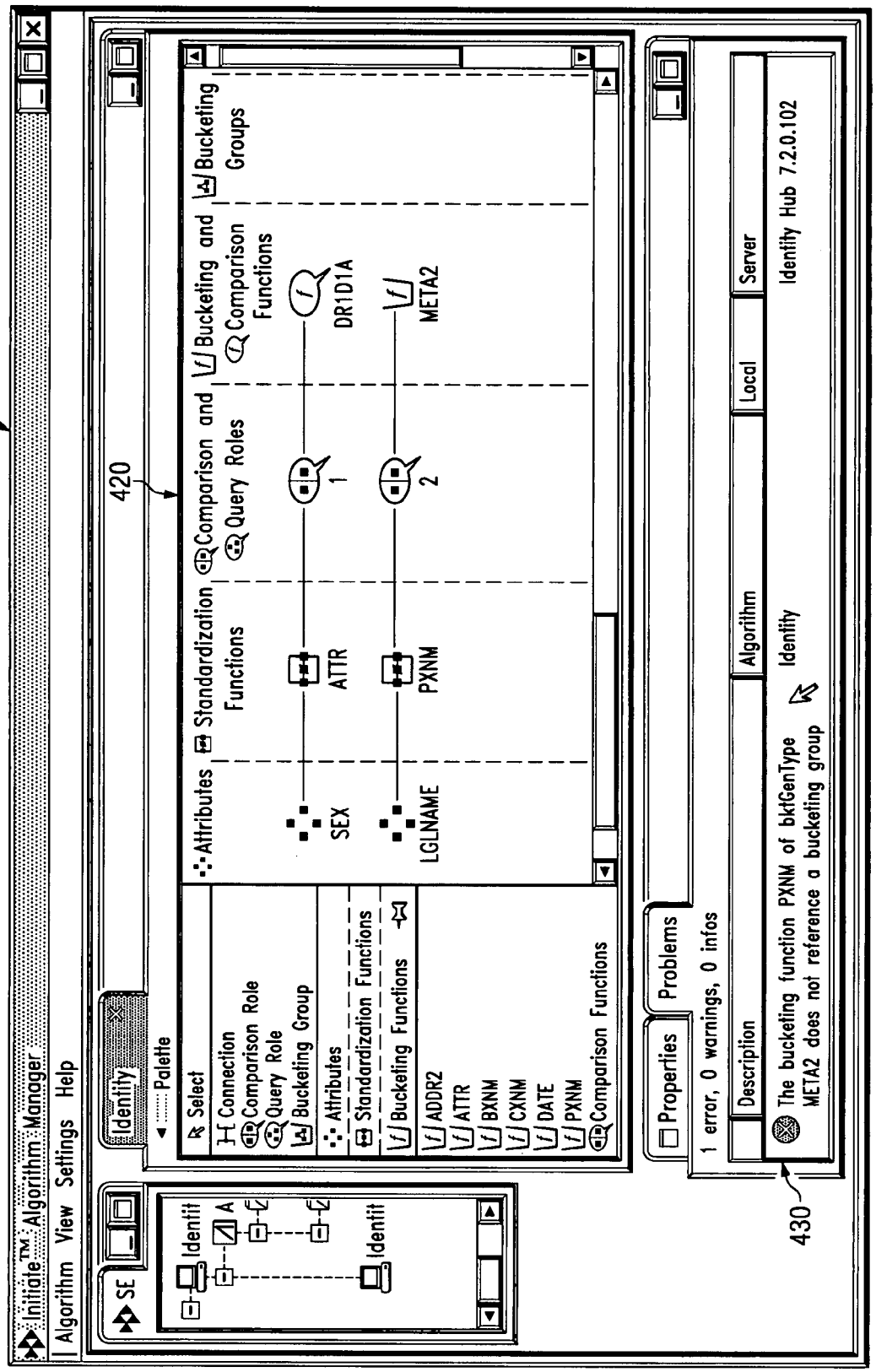

FIG. 15 depicts the notification of a validation problem with the current state of the representation of the algorithm by one embodiment of a graphical user interface while FIG. 16 depicts the connecting of a comparison role icon with a bucketing function icon in the current state of the representation of the algorithm using one embodiment of a graphical user interface. Here, a user has used connection icon 1622 to create a connection between "2" comparison role icon 1624 and "PXNM" bucketing function icon 1422 of generation type "META2". FIG. 17 depicts the presentation of validation problems with the current configuration of the representation of the algorithm in information window 430 using one embodiment of a graphical user interface.

Figure 18:
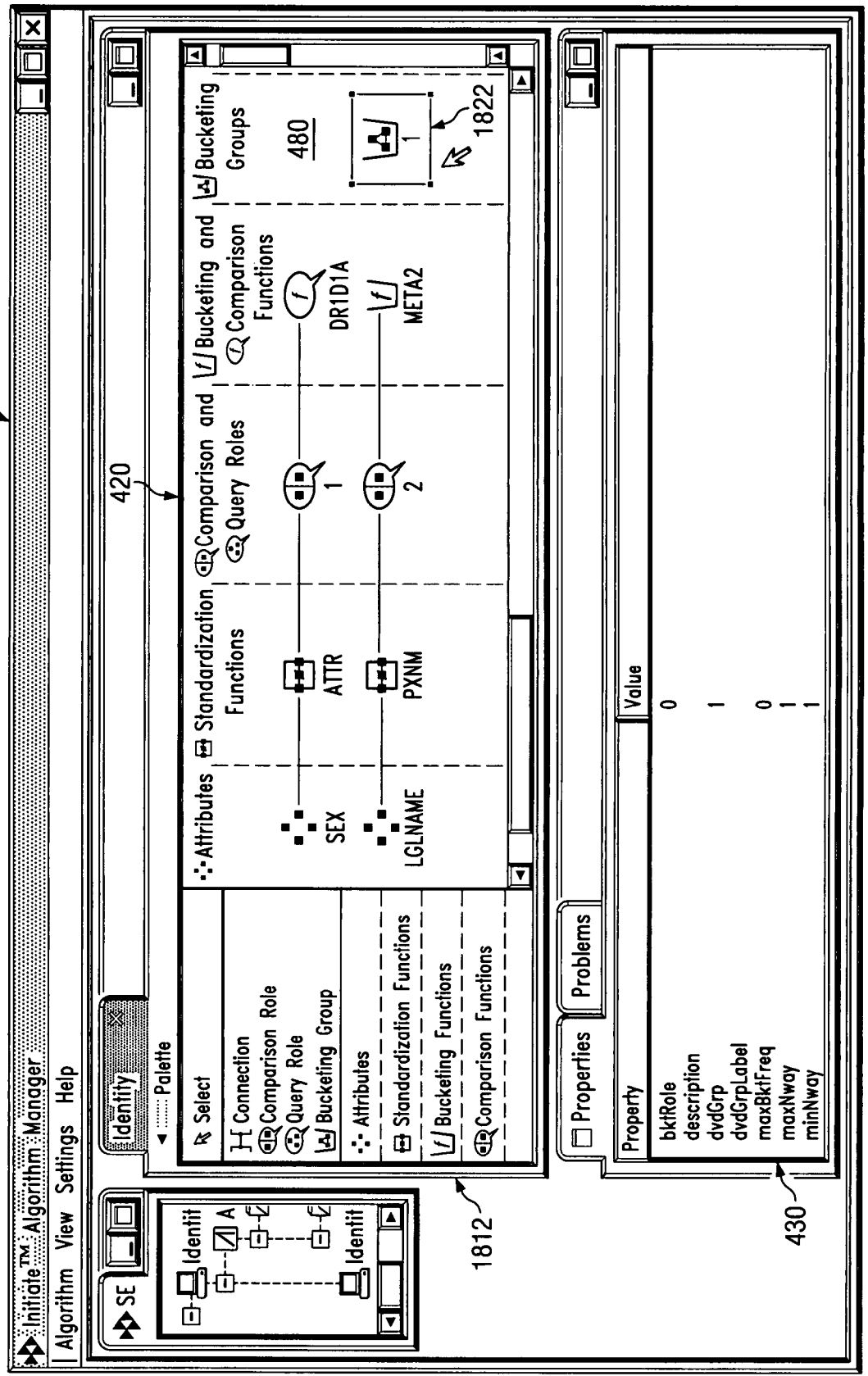

In FIG. 18 adding a representation of a bucketing group function to the current state of the representation of the algorithm using one embodiment of a graphical user interface is depicted. By clicking on bucketing group button 1812 a representation of a bucketing group may be added to the current state of the algorithm representation. Here, a user has added a representation of a bucketing group to the current state of the algorithm representation in bucketing group column 480 as "1" bucketing group icon 1822.

Figure 19:
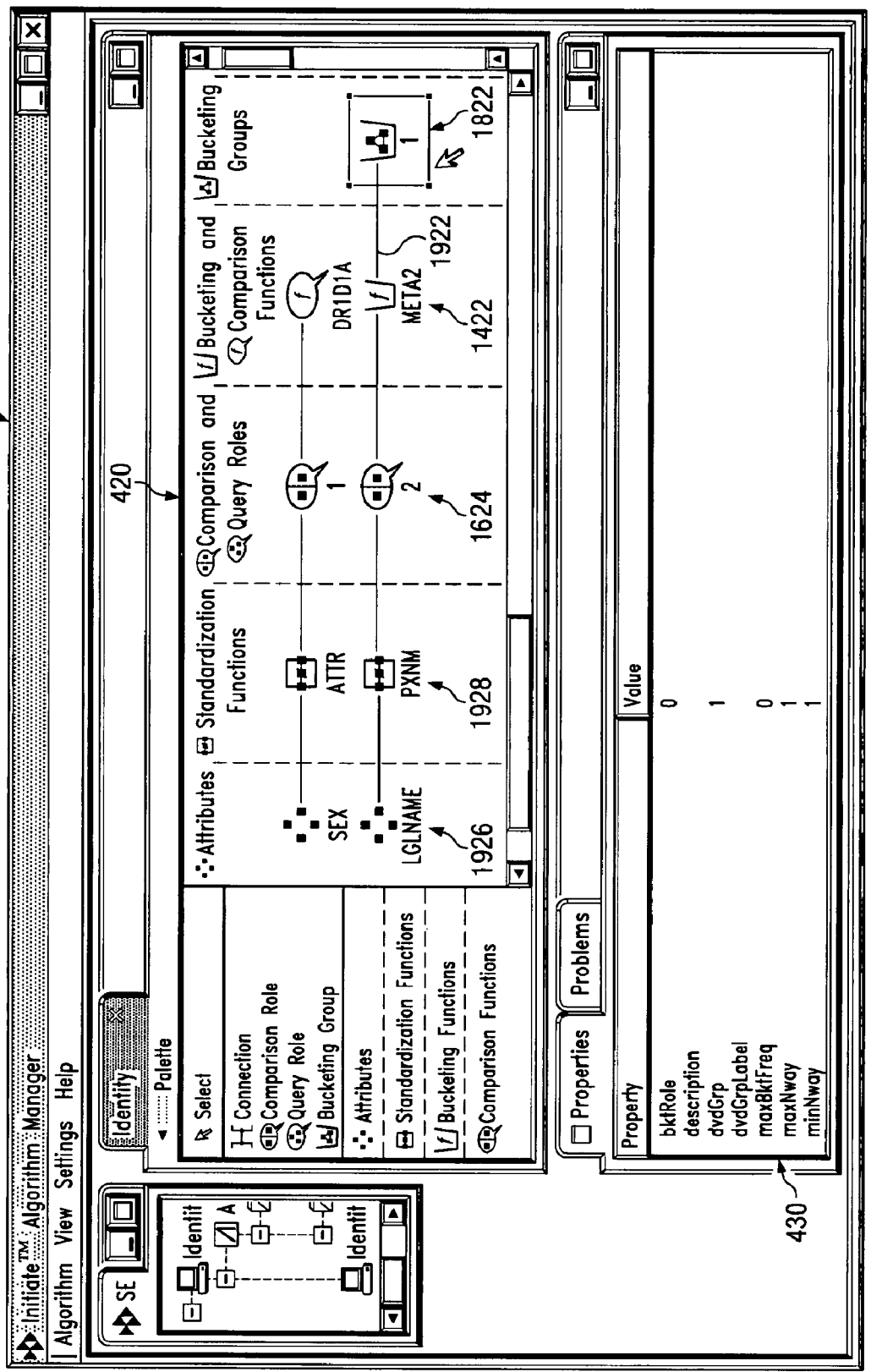

FIG. 19 depicts the connecting of a bucketing function icon with a bucketing group icon in the current state of the representation of the algorithm using one embodiment of a graphical user interface. Here, a user has used connection icon 1922 to create a connection between "1" bucketing group icon 1822 and "PXNM" bucketing function icon 1422 of generation type "META2", represented by bucketing group "1" (e.g., a set of candidates, step 330, above) should be created by comparing the data in comparison role "2" represented by comparison role icon 1624 (e.g., the standardization of the "LGLNAME" attribute represented by "LGLNAME" attribute icon 1926 as standardized by standardization function "PXNM" represented by standardization function icon 1928) using the "PXNM" bucketing function of generation type "META2" represented by bucketing function icon 1422. In other words, in a system configured according to the algorithm represented in algorithm window 420, a set of candidates may be generated during the matching or indexing of data records (e.g., step 330 above) by comparing the standardized "LGLNAME" attribute stored in location of 2 of each data record using the "PXNM" bucketing function of generation type "META2".

Figure 20:
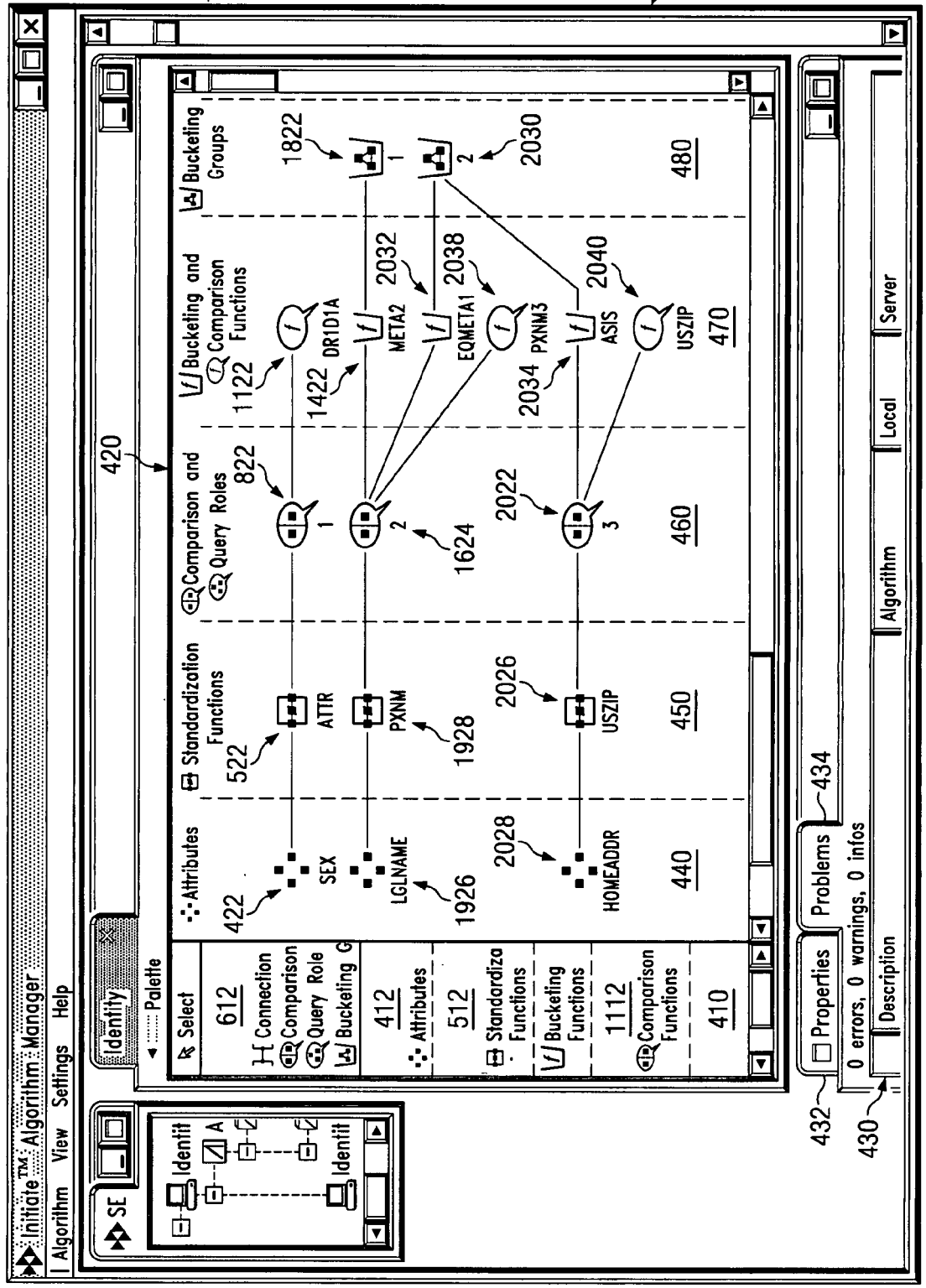

The updating of a representation of an algorithm in algorithm window 420 may continue using interface 400 as described above until a desired configuration or state for the representation of the algorithm is attained. Turning to FIG. 20, a representation of a more advanced algorithm constructed using one embodiment of a graphical user interface is depicted.

Specifically, if a system for matching or indexing data records were configured according to the representation of the algorithm in algorithm window 420 the system data records would be standardized (step 320 above) according to a data format that has three locations (e.g., table locations, array entries, etc.) represented by comparison role icons 822, 1924 and 2022. The first of those three locations corresponds to the "SEX" attribute of a data record standardized by the standardization function "ATTR" represented in algorithm window 420 by the connecting of comparison role icon 822 with "ATTR" standardization function icon 522 which is in turn connected to "SEX" attribute icon 422. The second of those three locations corresponds to the "LGLNAME" attribute of a data record standardized by the standardization function "PXNM" represented in algorithm window 420 by the connecting of comparison role icon 1624 with "PXNM" standardization function icon 1928 which is in turn connected to "LGLNAME" attribute icon 1926. The third of those three locations corresponds to the "HOMEADDR" attribute of a data record standardized by the standardization function "USZIP" represented in algorithm window 420 by the connecting of comparison role icon 2022 with "USZIP" standardization function icon 2026 which is in turn connected to "HOMEADDR" attribute icon 2028.

Continuing with the representation of the algorithm depicted in algorithm window of FIG. 20, if a system were configured according to the representation of this algorithm, two sets of candidates (i.e., bucket groups) would be created (step 330, above). The first set of candidates would be generated based on a comparison of a single attribute, using a "PXNM" bucketing function of generation type "META2", of the "LGLNAME" attribute, standardized according to a "PXNM" standardization function. This set of candidates is represented by "1" bucketing group icon 1822 connected to "PXNM" bucketing function icon 1422 of generation type "META2" which is connected to "2" comparison role icon 1624, which is connected to "PXNM" standardization function icon 1928 which is in turn connected to "LGLNAME" attribute icon 1926. The second set of candidates would be generated based on comparisons of two attributes. One comparison, using a "PXNM" bucketing function of generation type "EQMETA1", of the "LGLNAME" attribute, standardized according to a "PXNM" standardization function and another comparison, using an "ATTR" bucketing function of generation type "ASIS", of the "HOMEADDR" attribute, standardized according to a "USZIP" standardization function. This set of candidates is represented by "2" bucketing group icon 2030 connected to both "PXNM" bucketing function icon 2032 of generation type "EQMETA1" and "ATTR" bucketing function icon 2034 of generation type "ASIS". "PXNM" bucketing function icon 2032 of generation type "EQMETA1" is connected to "2" comparison role icon 1624, which is connected to "PXNM" standardization function icon 1928 which is in turn connected to "LGLNAME" attribute icon 1926. "ATTR" bucketing function icon 2034 of generation type "ASIS" is connected to "3" comparison role icon 2022, which is connected to "USZIP" standardization function icon 2026 which is in turn connected to "HOMEADDR" attribute icon 2028.

After creating the two sets of candidates, a system configured according to the representation of the algorithm depicted in algorithm window 420 the data records comprising these two sets of candidates would then be compared to the new or incoming data records (step 340) by comparing: the "SEX" attribute standardized according to the "ATTR" standardization function using the "USZIP" comparison function; the "LGLNAME" attribute standardized according to the "PXNM" standardization function using the "PXNM3" comparison function; and the "HOMEADDR" attribute standardized according to the "ATTR" standardization function using the "DR1D1A" comparison function. This configuration for the detailed comparison is represented by "DR1D1A" comparison function icon 1122 connected to "1" comparison role icon 822 connected to "ATTR" standardization function icon 522 connected to "SEX" attribute icon 422; "PXNM3" comparison function icon 2038 connected to "2" comparison role icon 1624 connected to "PXNM" standardization function icon 1928 connected to "LGLNAME" attribute icon 1926; and "USZIP" comparison function icon 2040 connected to "3" comparison role icon 2022 connected to "USZIP" standardization function icon 2026 connected to "HOMEADDR" attribute icon 2028.

Figure 21:
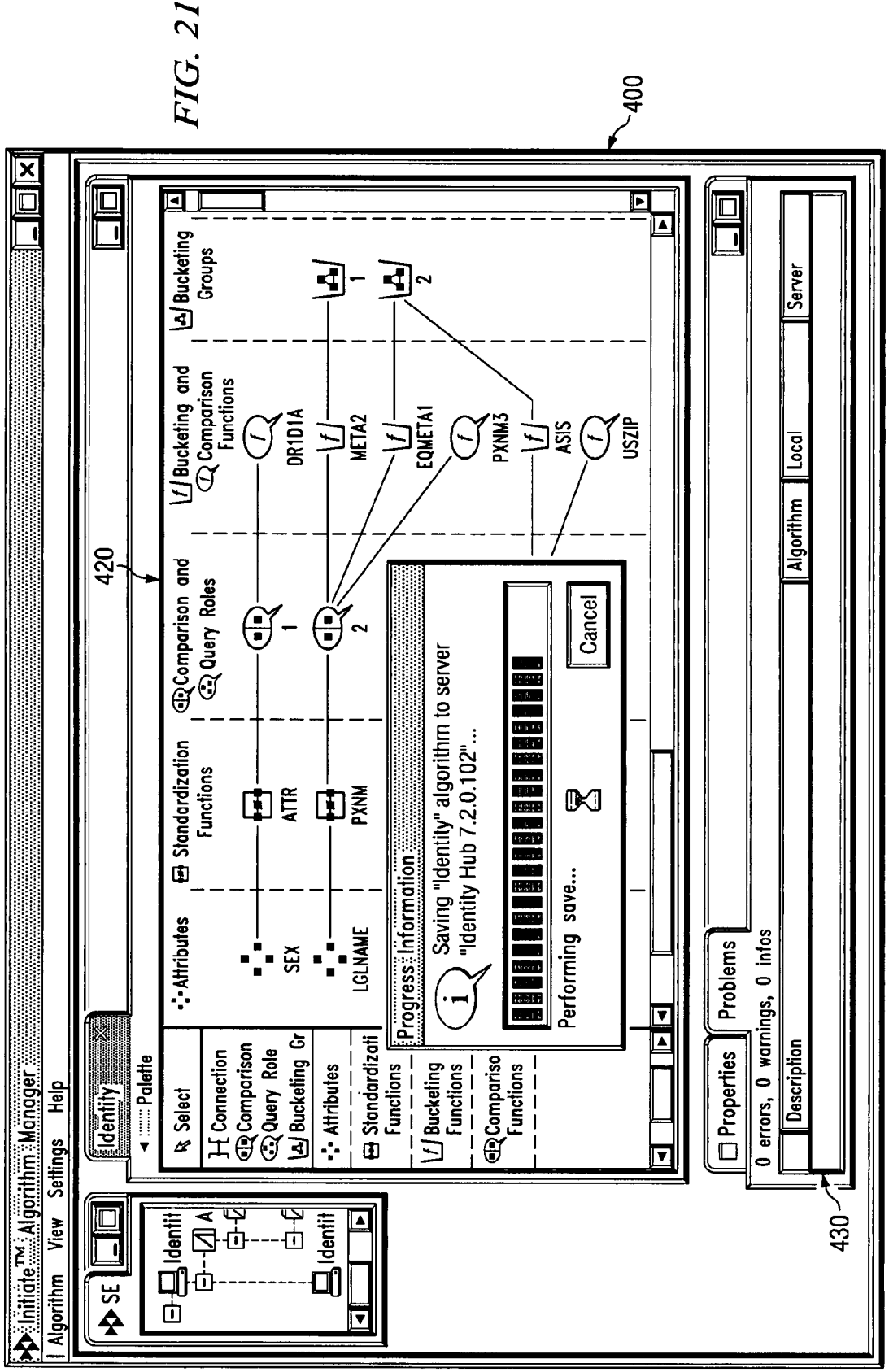

When an algorithm representation satisfactory to a user is displayed in algorithm window 420, this algorithm representation may then be saved. In one embodiment, the algorithm representation may be saved to a file for later editing through interface 400 or may be saved to the data base of a system for indexing or matching data records, which in one embodiment entails communicating the representation of the algorithm to the system (e.g., using an application programming interface) such that the system is configured (e.g., values set in tables or other data structures) according to the represented algorithm. One embodiment of the saving of the representation of an algorithm according to a graphical user interface is depicted in FIG. 21.

Note that when a user initially desires to create an algorithm, a representation of an algorithm may be initially displayed, where this representation was created from the current configuration of the system for matching or indexing records, or may be loaded from a local file systems where multiple representations of various algorithms in various states are stored, including a set of saved algorithm representations which may serve as a template or starting point for the construction of representations of similar algorithms.

Similarly, when a user saves the representation of an algorithm this algorithm may be saved back to a database of a system for indexing or matching data records (which may reject the representation if it is in an invalid state) or one or more local file systems (e.g. servers) for later editing.

Figure 32:
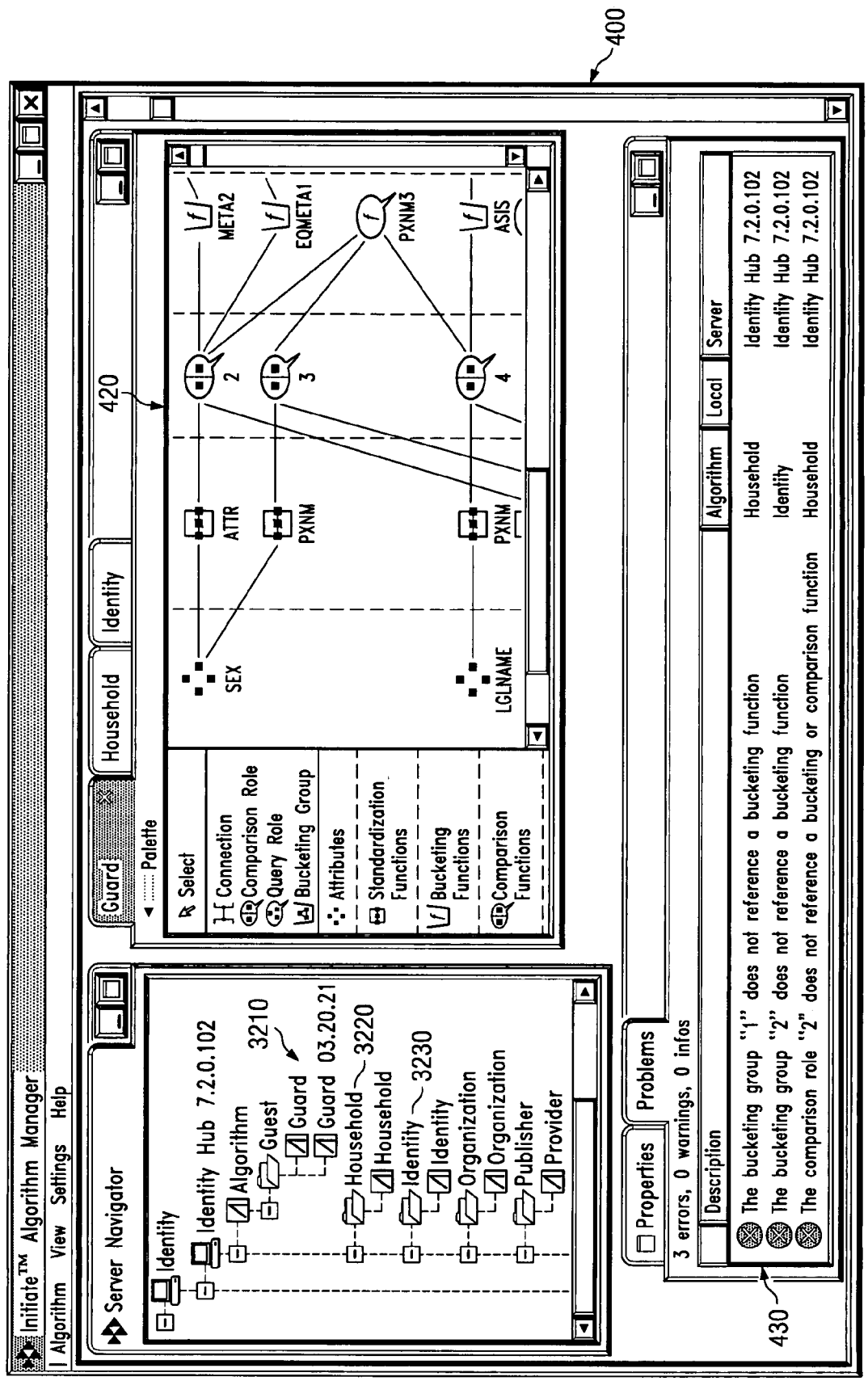

In order to facilitate this loading, saving, storing, etc. of representations of algorithms, a user interface may allow a user to view and manipulate representation of algorithms in various locations. Turning briefly to FIG. 32, interface 400 may, in one embodiment, present a user with server navigator window 3210 which may allow a user to view various sources (e.g. source icon 3220) from which representations of algorithms (e.g. algorithm icon 3230) may be obtained such as various indexing or matching systems, various servers or file systems, various sources of algorithm templates, etc. Server navigator 3210 may also serve to display the state of various saved algorithms, for example, if a particular save algorithm was in an invalid state an icon overlay (such as a red "x" or the like) may be placed on the folder icon representing the representation of the algorithm.

During construction of a representation of an algorithm for the configuration of a system for the indexing or matching of records a user may attempt to construct a representation of an algorithm that is invalid (e.g. if a system were configured according to an invalid algorithm the system would operate improperly or not at all or would produce undesired results). To ameliorate the possibility of configuring a system according to an invalid algorithm, in one embodiment, the interface for configuring a system for the matching or indexing of data records may prevent a user from constructing a representation of an invalid algorithm.

In one embodiment, interface 400 may utilize a rule-based validation methodology. More particularly, in one embodiment, interface 400 may have access to a set of rules (e.g., a data store comprising rules) defining inter- and intra-component rules which may be applied during creation or editing of an algorithm representation, such as what parameters need to be defined for a particular component so that it may function properly (either standalone or in relation to the configuration of the other components to which it is connected), which components may be connected with one another, which components may be added to certain columns of algorithm window 420 or almost any other type of validation checking it is desired to perform in conjunction with the creating, editing, manipulation, saving, etc. of a representation of an algorithm.

Figure 22:
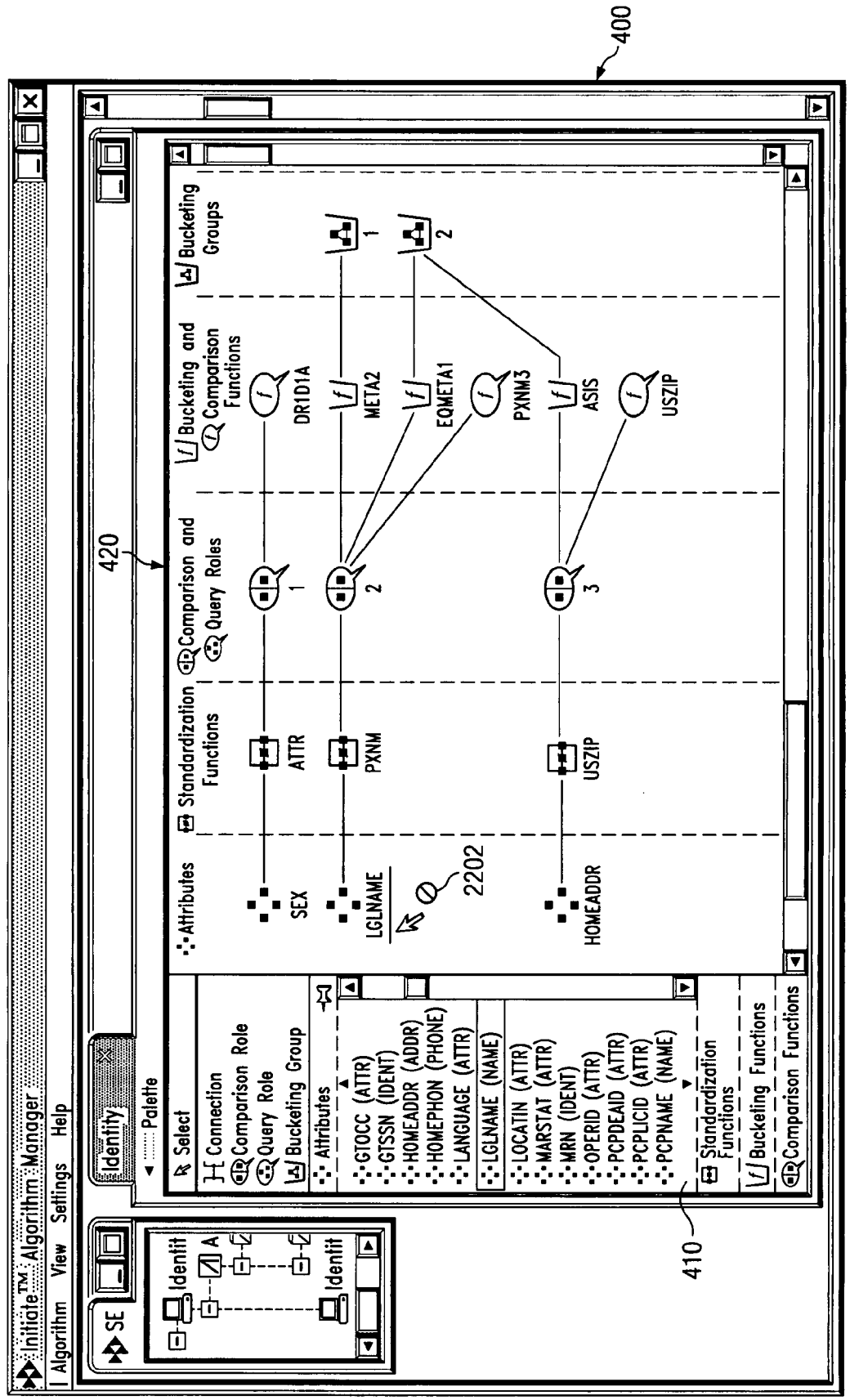

FIGS. 22-28 depict various ways in which an embodiment of a graphical user interface may prevent a user from constructing a representation of an invalid algorithm, or alert a user to the fact that a current representation of the algorithm is in an invalid state. More specifically, FIG. 22, depicts how one embodiment of a graphical user interface for configuring a system for indexing or matching data records prevents the addition of duplicate icons. Specifically, interface 400 may display "not allowed" cursor 2202 when a user tries to add a duplicate attribute (e.g., the attribute is already represented in algorithm window 420) to the representation of an algorithm displayed in algorithm window 420. Here the user has tried to add a duplicate "LGLNAME" attribute icon from palette 410 and is thus presented with the "not allowed" cursor 2202.

Figure 23:
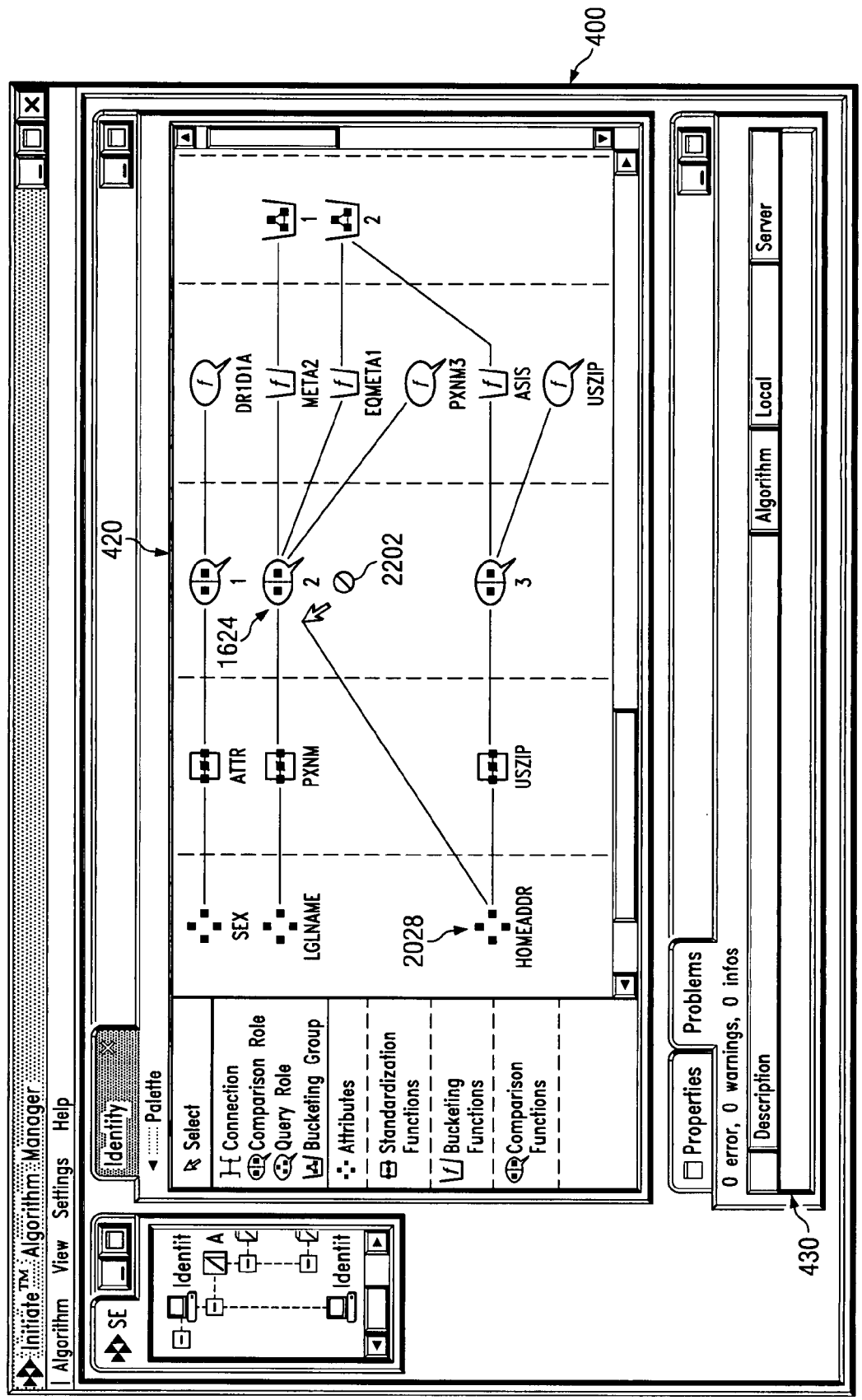

FIG. 23 depicts how one embodiment of a graphical user interface for configuring a system for indexing or matching data records prevents the incorrect connecting of icons in a representation of an algorithm. Here the user is presented with the "not allowed" cursor 2202 when a user tries to connect "HOMEADDR" attribute icon 2028 with "2" comparison role icon 1624 which would result in an incorrect state of the representation of the algorithm in algorithm window 420.

Figure 24:
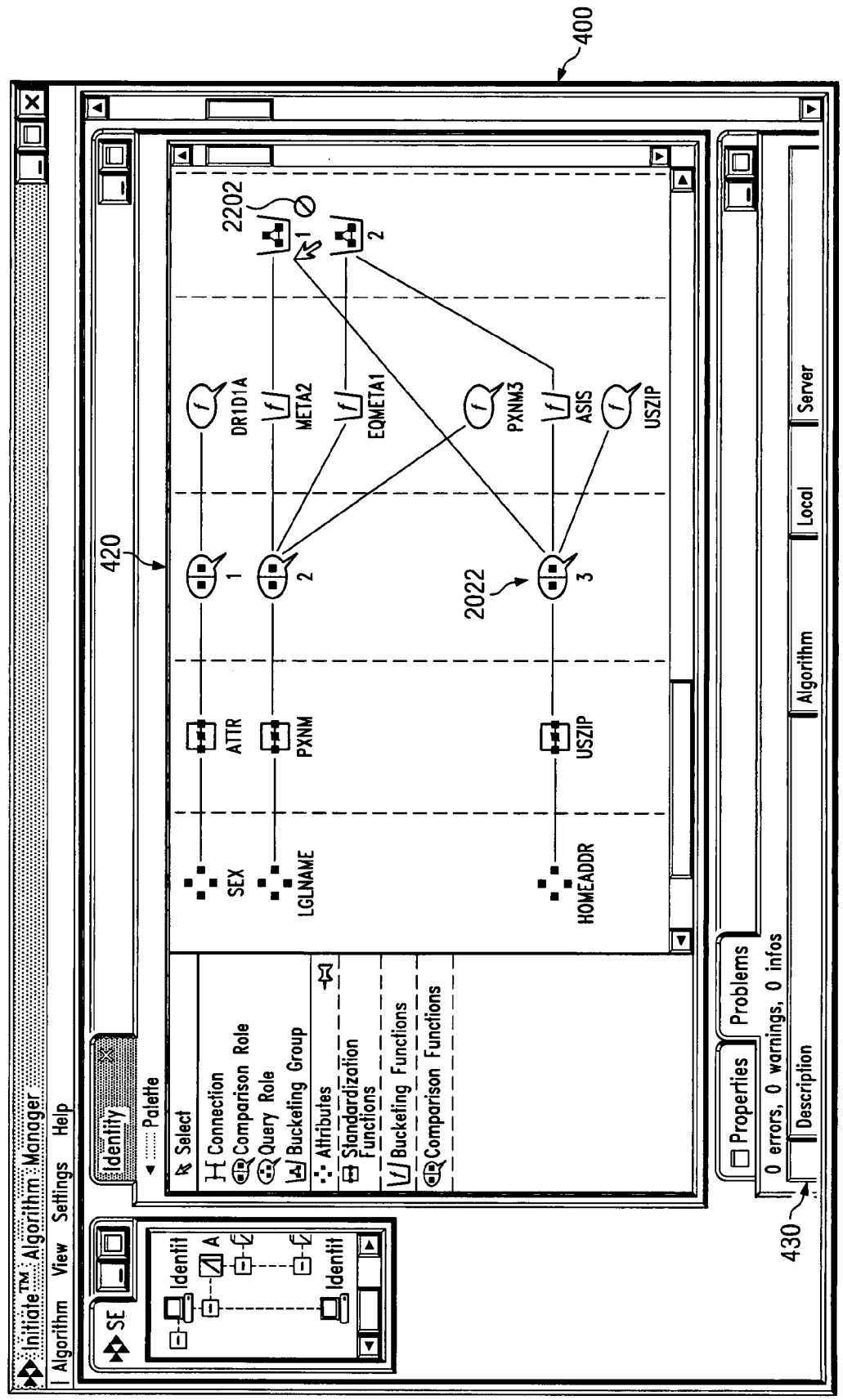

FIG. 24 depicts how one embodiment of a graphical user interface for configuring a system for indexing or matching data records prevents the incorrect connecting of icons in a representation of an algorithm. Here the user is presented with the "not allowed" cursor 2202 when a user tries to connect "3" comparison role icon 2022 with comparison role icon 1624.

Figure 25:
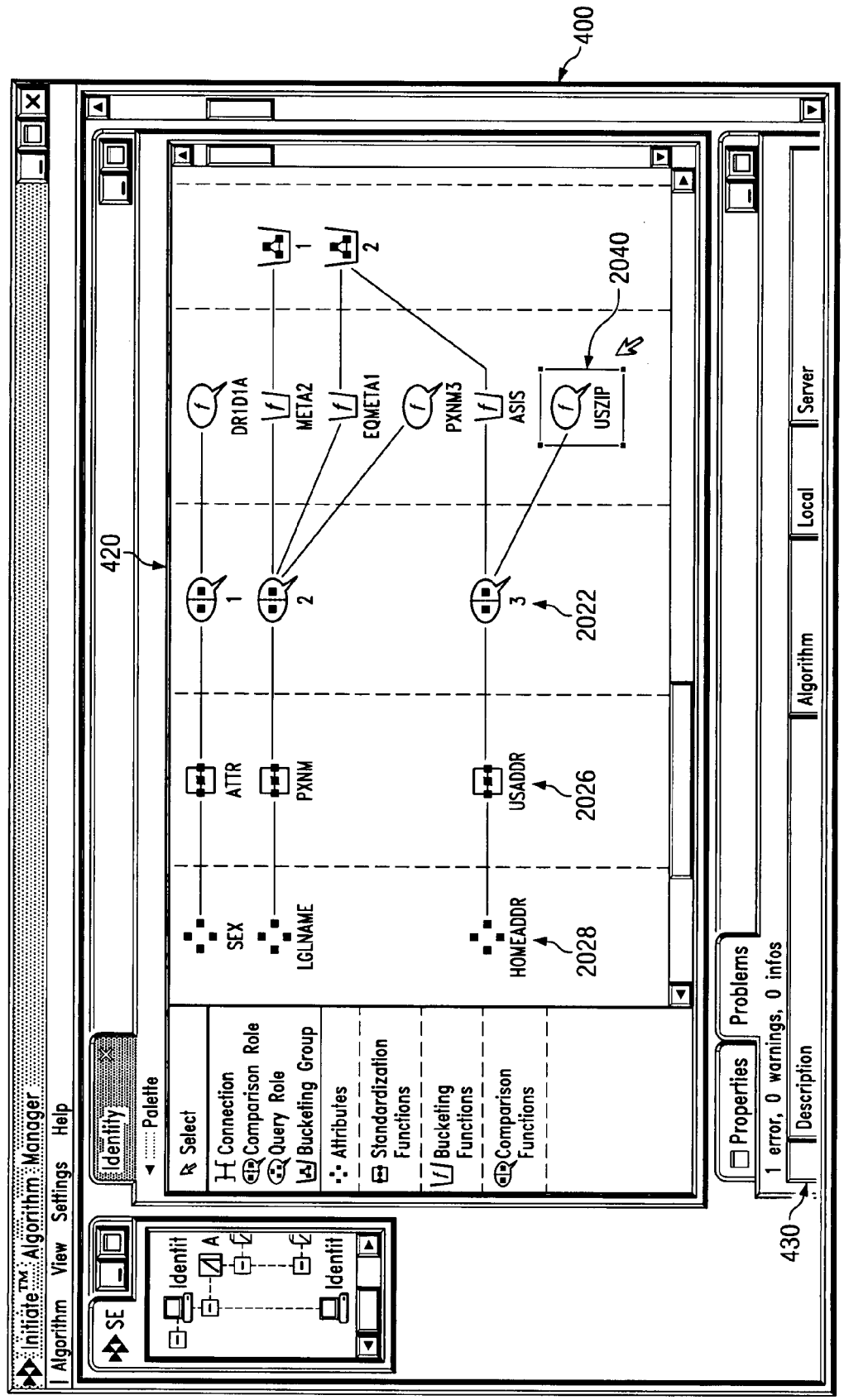

FIG. 25 depicts how one embodiment of a graphical user interface for configuring a system for indexing or matching data records analyzes the direct and indirect connections between component icons to check for configuration problems (e.g., as opposed to just validating a direct connection); in this example, interface 400 detects that the "USZIP" comparison function icon 2040 has been incorrectly associated with the "USADDR" standardization function icon 2026 (e.g., indirectly connected); highlights each of the icons 2022, 2026 and 2028 connected to the "USZIP" comparison function icon 2040 and displays a validation error message in information window 430 including the allowed standardization functions which can be used with the "USZIP" comparison function.

Figure 26:
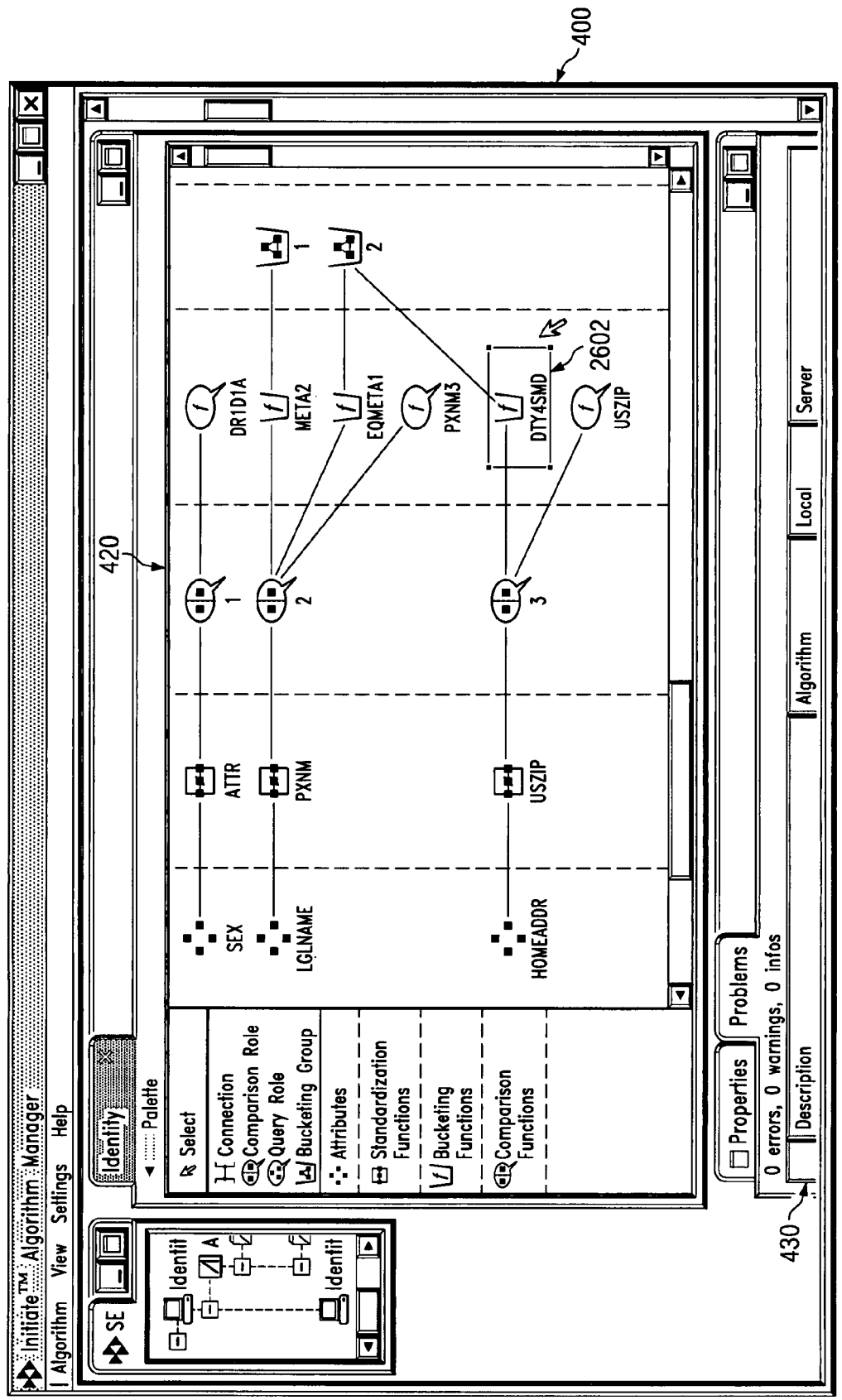

FIG. 26 depicts how one embodiment of a graphical user interface for configuring a system for indexing or matching data records validates the configuration of single components of the represented algorithm. In this example, the interface has detected the ATTR bucketing function icon 2602 has its generation type (i.e., bktGenType property) set to "DTY4SMD" (and is labeled as such) which is an invalid configuration. Note the various associated icons are highlighted in algorithm window 420 as well and the problem is displayed to the user in information window 430.

Figure 27:
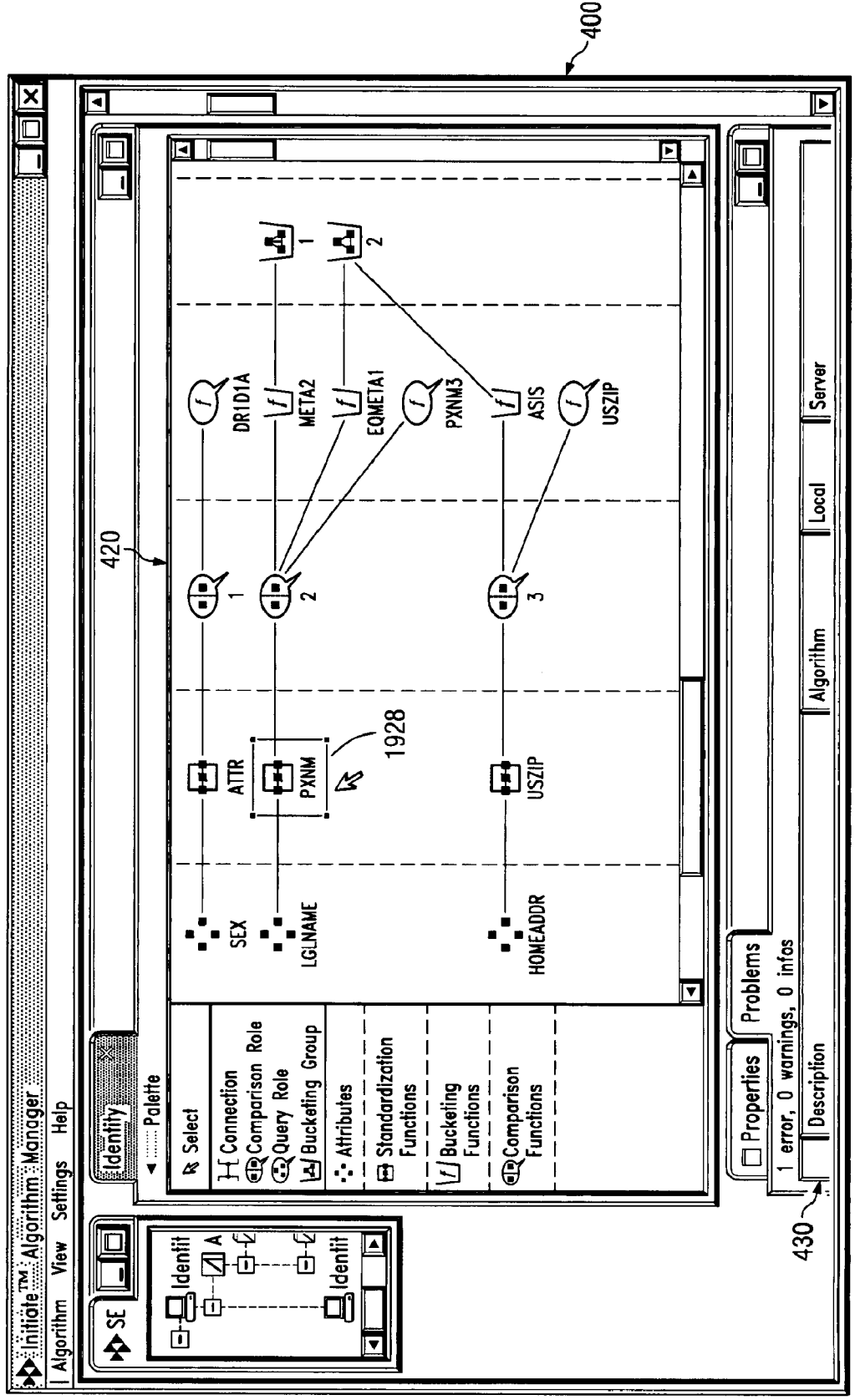

FIG. 27 depicts how one embodiment of a graphical user interface for configuring a system for indexing or matching data records validates the configuration of single components of the represented algorithm. Here the interface 400 has detected that the user has configured an invalid property, equiStrCode, for the "PXNM" standardization function associated with "PXNM" standardization function icon 1928. Note the various associated icons are highlighted in algorithm window 420 as well and the problem is displayed to the user in information window 430.

Figure 28:
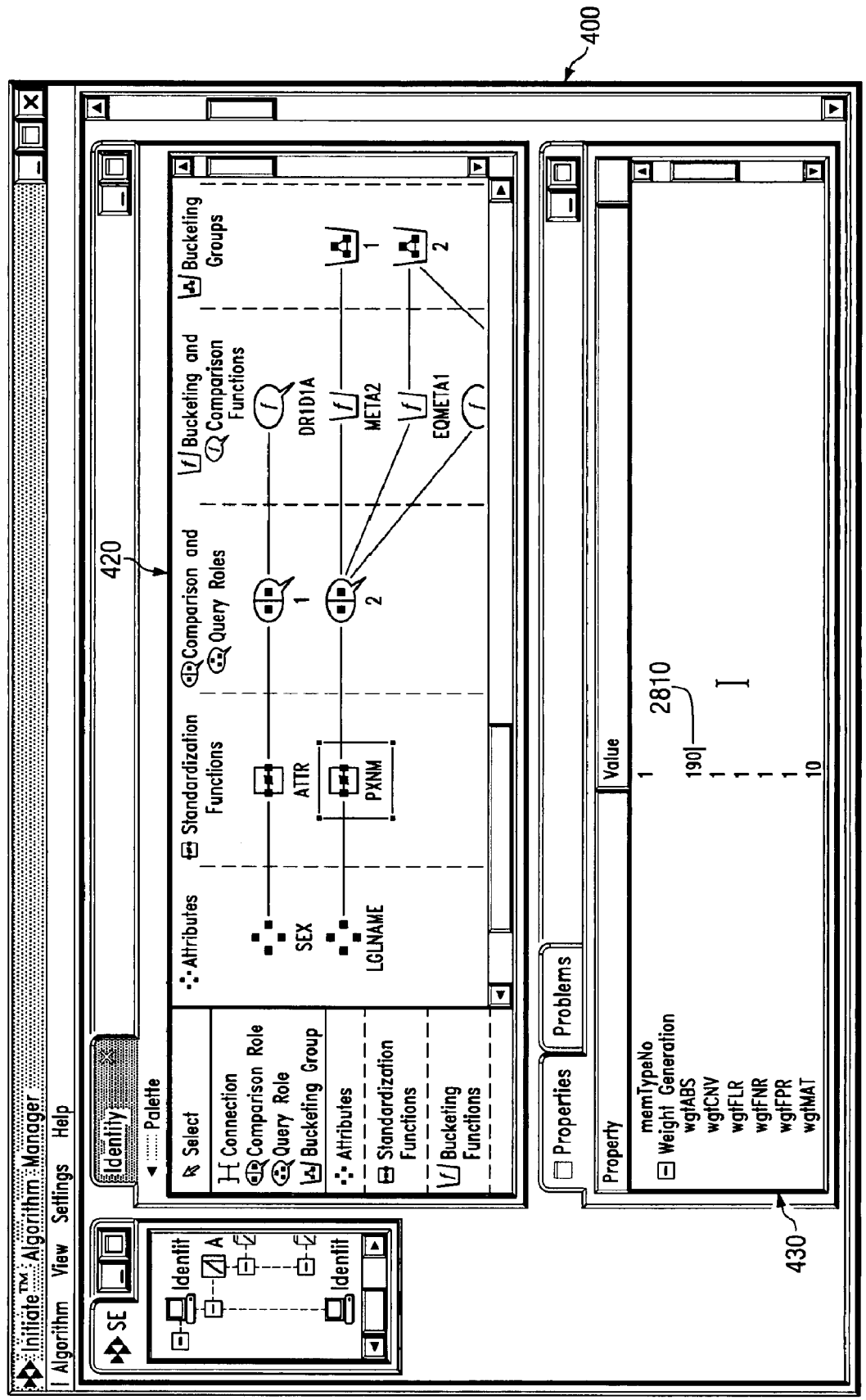

FIG. 28 depicts how one embodiment of a graphical user interface for configuring a system for indexing or matching data records validates the configuration of single components of the represented algorithm. Specifically, as a user edits a component property associated with an icon displayed in algorithm window 420, the value may be checked against a set of allowed values or boundary conditions by interface 400, if a problem is detected where the problem occurs is presented in information window 430 and the problem itself is presented in status bar 2810. In this example, the integer value for the wgtABS property must be a value in the range 10 to 180.

As may be imagined, very complex algorithms may be utilized to configure the indexing and matching of data records. Commensurate with this complexity, the representation of such an algorithm in algorithm window 420 may be similarly complex, and thus the connections between different represented components may be difficult to visualize (e.g., the various attribute icons, standardization function icons, comparison role icons, bucketing function icons, etc., connected directly or indirectly to a bucketing group icon). Accordingly, in one embodiment of the present invention, an interface for configuring a system for indexing or matching data records may provide the ability to visualize the connections between icons comprising the representation of a current state of an algorithm. By providing this ability, a user of an interface is able to verify that the representation of an algorithm which he has constructed is configured as he desires and thus will function as he desires as well.

Figure 29:
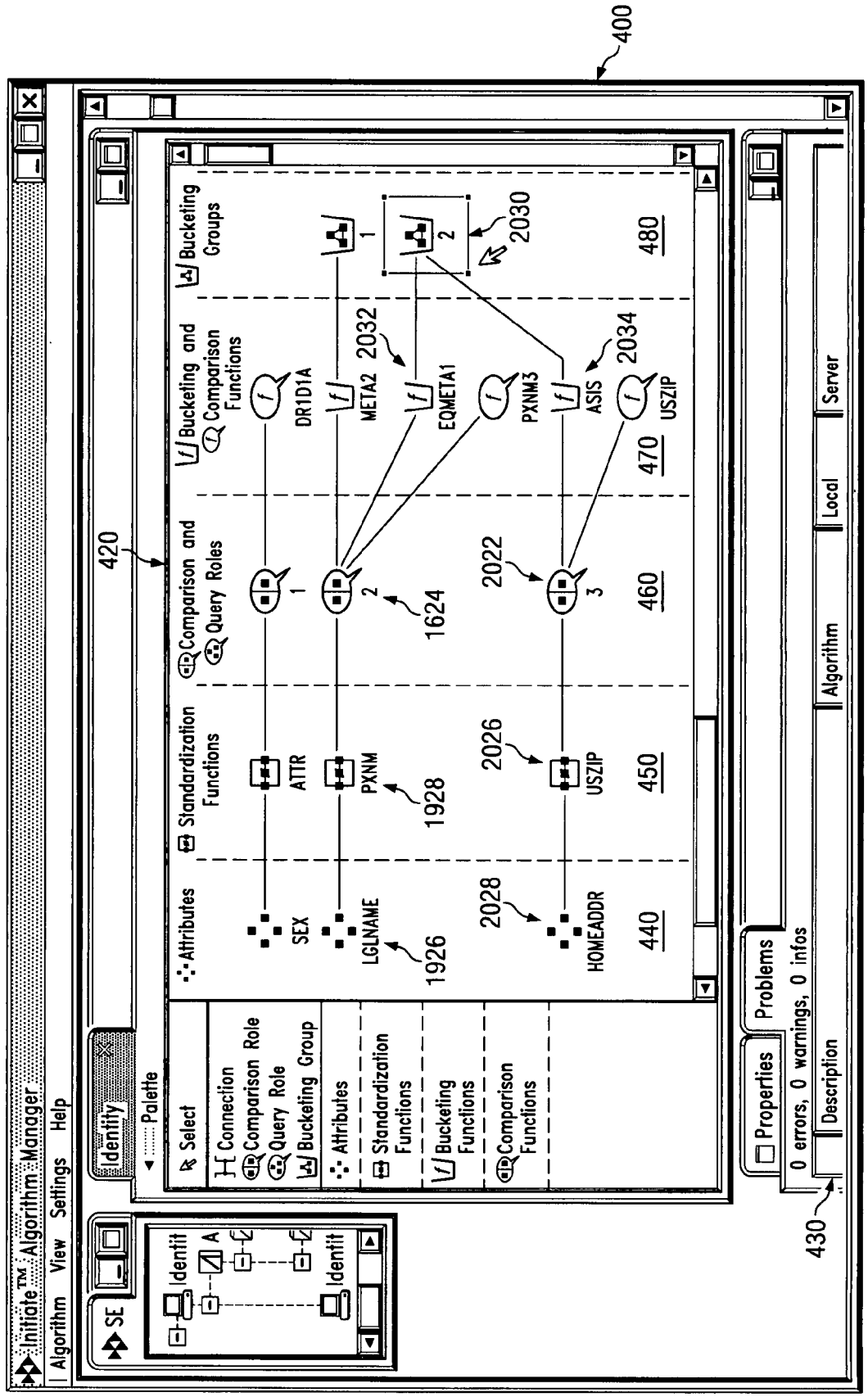
Figure 30:
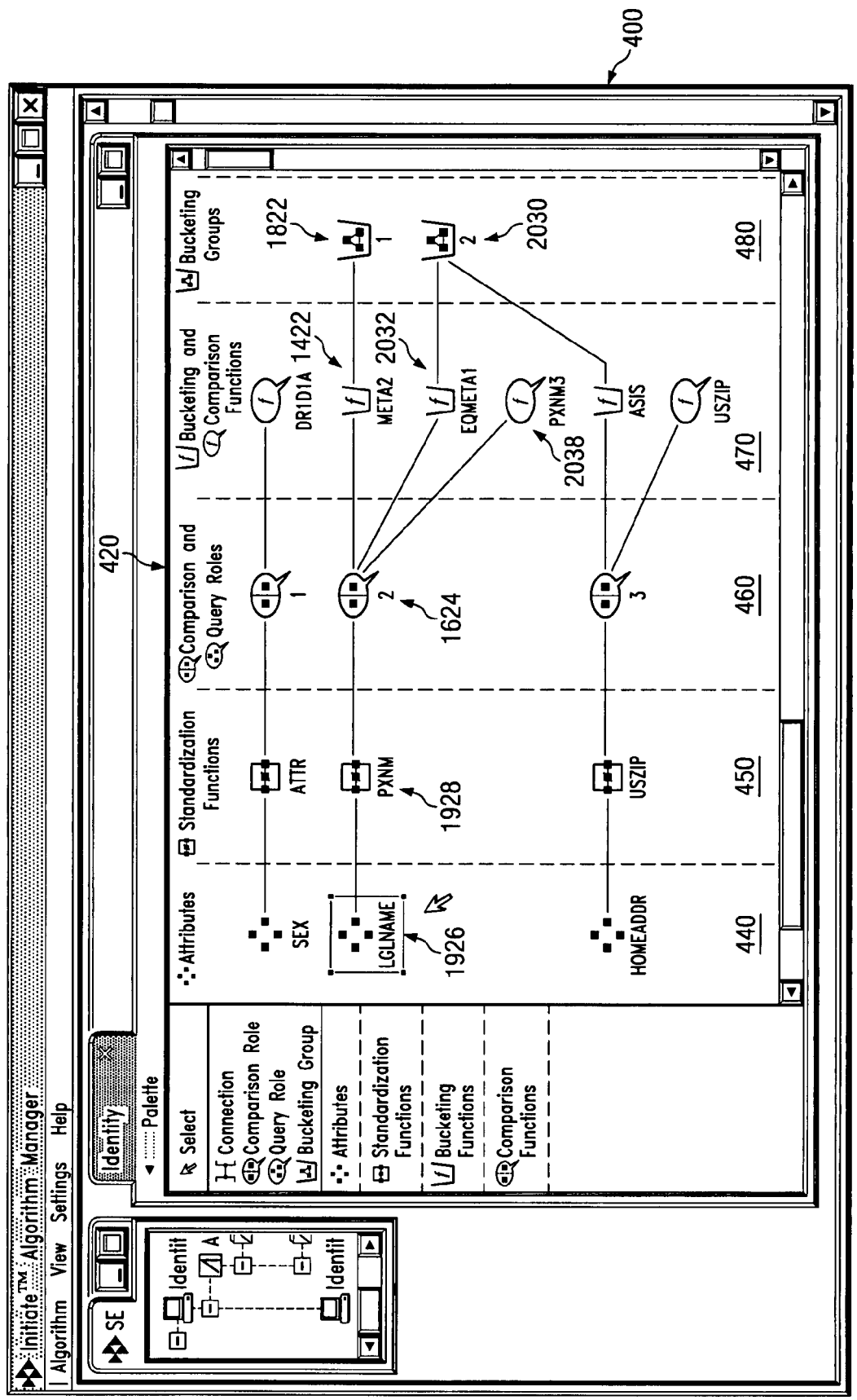
Figure 31:
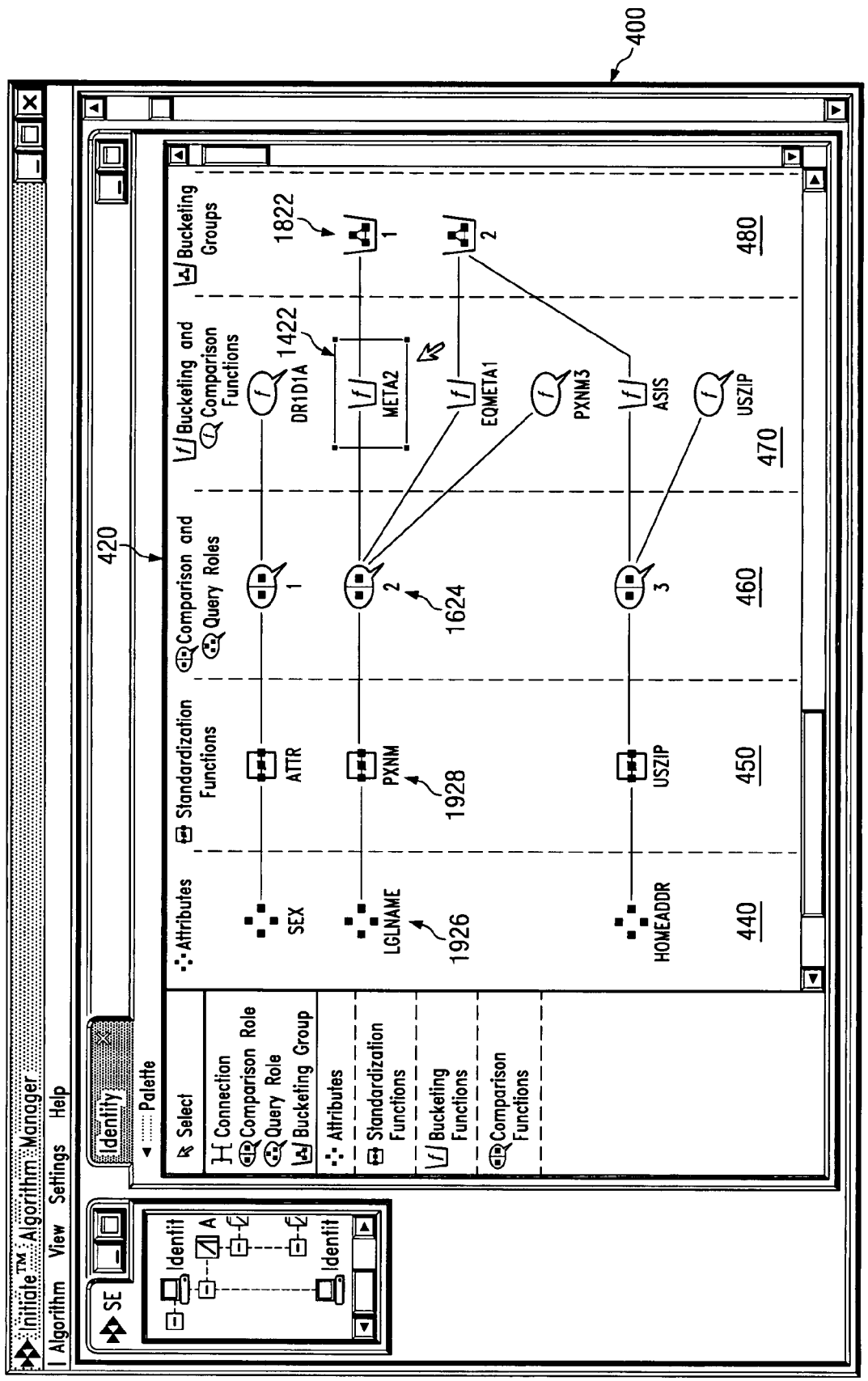

An explanation of embodiments of these abilities may be provided with respect to FIGS. 29-31 which depict one embodiment a graphical user interface operable to display related icons of a current state of a representation of an algorithm. Referring to FIG. 29, one embodiment of a graphical user interface is depicted where by highlighting or selecting an icon of the representation of the algorithm displayed related icons will be highlighted. More specifically, here a user has highlighted or selected "2" bucketing group icon 2030. When "2" bucketing group icon 2030 is selected, interface 400 may display icons connected to "2" bucketing group icon 2030 icon either directly or indirectly. In one embodiment, as "2" bucketing group icon 2030 is on an edge (e.g., in first column, attribute column 440 or last column, bucketing group column 480) the related connections may be ascertained and highlighted by interface 400 from adjacent column to most distant column, with all of the related icons highlighted in one column before proceeding to the next.

For example, when a user selects "2" bucketing group icon 2030 in bucketing group column 480 interface 400 may highlight all icons in bucketing and comparison function column 470 directly connected to bucketing group icon 2030, namely "PXNM" bucketing function icon 2032 of generation type "EQMETA1" and "ATTR" bucketing function icon 2034 of generation type "ASIS". The interface may then highlight all icons in comparison and query role column 460 directly connected to either directly connected to "PXNM" bucketing function icon 2032 of generation type "EQMETA1" or "ATTR" bucketing function icon 2034 of generation type "ASIS", here "2" comparison role icon 1624 and "3" comparison role icon 2022. Icons in standardization function column 450 which are directly connected to either related to "2" comparison role icon 1624 or "3" comparison role icon 2022 are highlighted next by interface 400; specifically "PXNM" standardization function icon 1928 and "USZIP" standardization function icon 2026. Interface 400 can then highlight icons in attribute column 440 directly connected to the highlighted icons in standardization function column 450, in the example depicted "LGLNAME" attribute icon 1926 and "HOMEADDR" attribute icon 2028.

Another example of the highlighting of related icons using an embodiment of a graphical user interface is depicted in FIG. 30. Here a user has highlighted or selected "LGLNAME" attribute icon 1926. When "LGLNAME" attribute icon 1926 is selected, interface 400 may highlight icons connected to "LGLNAME" attribute icon 1926. In one embodiment, as "LGLNAME" attribute icon 1926 is on an edge (e.g., in first column, attribute column 440) the related connections may be ascertained and highlighted by interface 400 from adjacent column to most distant column, with all of the related icons highlighted in one column before proceeding to the next.

For example, when a user selects "LGLNAME" attribute icon 1926 in attribute column 440 interface 400 may highlight all icons in standardization function column 450 which are directly connected to "LGLNAME" attribute icon 1926, namely "PXNM" standardization function icon 1928. Interface 400 may then highlight all icons in comparison and query role column 460 directly connected to "PXNM" standardization function icon 1928, which in this example is "2" comparison role icon 1624. Next, interface 400 may highlight icons bucketing and comparison function column 470 directly connected to "2" comparison role icon 1624, here "PXNM" bucketing function icon 1422 of generation type "META2", "PXNM" bucketing function icon 2032 of generation type "EQMETA1" and "PXNM3" comparison function icon 2038. Finally, icons in bucketing group column 480 which directly connect to any of the highlighted icons in bucketing and comparison function column 470 may themselves be highlighted by interface 400, here "1" bucketing group icon 1822 and "2" bucketing group icon 2030.

Similarly, embodiments of the graphical user interface may have the ability to highlight related icons if an icon is selected which is not in an edge column. FIG. 31 depicts such an example of the highlighting of related icons using an embodiment of a graphical user interface. If a user has highlighted or selected "PXMN" bucketing function icon 1422 of generation type "META2", interface 400 may highlight icons connected to it (e.g., to both edge columns). In one embodiment, the related connections may be ascertained and highlighted by interface 400 from adjacent column to most distant column.

Thus, when a user selects "PXMN" bucketing function icon 1422 of generation type "META2" in bucketing and comparison function column 470 interface 400 may highlight all icons in comparison and query role column 460 (e.g., "2" comparison role icon 1624) and bucketing group column 480 (e.g., "1" bucketing group icon 1822). Next, interface 400 may highlight all icons in standardization function column 450 which are connected to "2" comparison role icon 1624, namely "PXNM" standardization function icon 1928; followed by highlighting all icons in attribute column 440 which are connected to "PXNM" standardization function icon 1928, here "LGLNAME" attribute icon 1926.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments.

However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for configuring an association of data records, comprising:
providing a system having an identity hub coupled to a set of data sources and a set of operator computers via a network, wherein the identity hub is configured to store a link between one or more data records in the set of data sources and for transforming a data record from a native data format to a standard data format;
presenting a user with an interface at an operator computer, wherein the interface comprises software tools with which the user is able to manipulate a graphical representation of an algorithm for a configuration of the identity hub for associating data records from the set of data sources, the interface is configured to display a set of attributes and allow the user to select a representation of an attribute and to display a set of bucketing functions associated with the identity hub, allow the user to select a representation of a bucketing function, allow the user to create a representation of a bucketing group and associate the representation of the bucketing group with the representation of the bucketing function and the attribute and the interface is further configured to display a set of standardization functions associated with the identity hub, allow the user to select a representation of a standardization function and associate the representation of the attribute with the representation of the standardization function; and
creating or modifying the algorithm according to the graphical representation of the algorithm as manipulated by the user utilizing the interface, wherein the identity hub is correspondingly configured to associate data records by:
receiving a data record;
identifying a set of candidate data records, wherein identifying a set of candidate data records is done by comparing the data record to a set of existing data records according to the algorithm; and
scoring each of the set of candidate data records, wherein a score of each of the set of candidate data records is calculated by comparing the data record to the candidate data record according to the algorithm and the score represents a probability of a match between the candidate data record and the received data record.

2. The method of claim 1, wherein the interface is configured to allow the user to enter configuration parameters for the bucketing function or the bucketing group.

3. The method of claim 1, wherein the set of candidate data records corresponds to the bucketing group and the identity hub identifies the set of candidate records using the bucketing function and the attribute.

4. The method of claim 3, wherein the interface is configured to display a set of comparison functions associated with the identity hub, allow the user to select a representation of a comparison function and associate the comparison function with the attribute.

5. The method of claim 4, wherein the interface is configured to allow the user to enter configuration parameters for the comparison function.

6. The method of claim 5, wherein the identity hub scores the set of candidate records using the comparison function and the attribute.

7. The method of claim 6, wherein the interface is configured to allow the user to enter configuration parameters for the standardization function.

8. The method of claim 6, wherein transforming a data record comprises transforming the attribute of the data record according to the standardization function.

9. The method of claim 8, wherein the interface is configured to allow the user to create a representation of a comparison role or a query role.

10. The method of claim 9, wherein the interface is configured to allow the user to associate the representation of the bucketing function with the representation of the comparison role, associate the representation of the comparison function with the representation of the comparison role or associate the representation of the comparison role with the standardization function.

11. The method of claim 10, wherein the interface is configured to allow the user to enter configuration parameters for the comparison role or query role.

12. The method of claim 1, wherein the interface is configured to verify the representation of the algorithm based on a set of rules.

13. The method of claim 12, wherein verifying the representation of the algorithm comprises verifying the associations between components of the representation of the algorithm.

14. The method of claim 12, wherein verifying the representation of the algorithm comprises verifying a configuration of one or more components of the representation of the algorithm.

15. The method of claim 1, wherein the interface is configured to highlight components associated with a selected component.

16. Tangible computer readable media in a system having an identity hub coupled to a set of data sources and a set of operator computers via a network, wherein the identity hub is configured to store a link between one or more data records in the set of data sources and for transforming a data record from a native data format to a standard data format, and wherein said tangible computer readable media store instructions translatable by a processor for:
presenting a user with an interface at an operator computer, wherein the interface enables the user to manipulate a graphical representation of an algorithm for a configuration of the identity hub for associating data records from the set of data sources, the interface is configured to display a set of attributes and allow the user to select a representation of an attribute and to display a set of bucketing functions associated with the identity hub, allow the user to select a representation of a bucketing function, allow the user to create a representation of a bucketing group and associate the representation of the bucketing group with the representation of the bucketing function and the attribute and the interface is further configured to display a set of standardization functions associated with the identity hub, allow the user to select a representation of a standardization function and associate the representation of the attribute with the representation of the standardization function; and
creating or modifying the algorithm according to the graphical representation of the algorithm as manipulated by the user utilizing the interface, wherein the identity hub is correspondingly configured to associate data records by:

receiving a data record;

identifying a set of candidate data records, wherein identifying a set of candidate data records is done by comparing the data record to a set of existing data records according to the algorithm; and scoring each of the set of candidate data records, wherein a score of each of the set of candidate data records is calculated by comparing the data record to the candidate data record according to the algorithm and the score represents a likelihood probability of a match between the candidate data record and the received data record.

17. The computer readable media of claim 16, wherein the interface is configured to allow the user to enter configuration parameters for the bucketing function or the bucketing group.

18. The computer readable media of claim 17, wherein the set of candidate data records corresponds to the bucketing group and the identity hub identifies the set of candidate records using the bucketing function and the attribute.

19. The computer readable media of claim 18, wherein the interface is configured to display a set of comparison functions associated with the identity hub, allow the user to select a representation of a comparison function and associate the comparison function with the attribute.

20. The computer readable media of claim 19, wherein the interface is configured to allow the user to enter configuration parameters for the comparison function.

21. The computer readable media of claim 20, wherein the identity hub scores the set of candidate records using the comparison function and the attribute.

22. The computer readable media of claim 21, wherein the interface is configured to allow the user to enter configuration parameters for the standardization function.

23. The computer readable media of claim 22, wherein transforming a data record comprises transforming the attribute of the data record according to the standardization function.

24. The computer readable media of claim 23, wherein the interface is configured to allow a user to create a representation of a comparison role or a query role.

25. The computer readable media of claim 24, wherein the interface is configured to allow the user to enter configuration parameters for the comparison role or query role.

26. The computer readable media of claim 24, wherein the interface is configured to allow the user to associate the representation of the bucketing function with the representation of the comparison role, associate the representation of the comparison function with the representation of the comparison role or associate the representation of the comparison role with the standardization function.

27. The computer readable media of claim 16, wherein the interface is configured to verify the representation of the algorithm based on a set of rules.

28. The computer readable media of claim 27, wherein verifying the representation of the algorithm comprises verifying the associations between components of the representation of the algorithm.

29. The computer readable media of claim 28, wherein verifying the representation of the algorithm comprises verifying a configuration of one or more components of the representation of the algorithm.

30. The computer readable media of claim 16, wherein the interface is configured to highlight components associated with a selected component.

31. A system for configuring an association of data records, comprising:

an identity hub coupled to a set of data sources and a set of operator computers via a network, wherein the identity hub is configured to store a link between one or more data records in the set of data sources and for transforming a data record from a native data format to a standard data format;

an interface presented at an operator computer, wherein the interface comprises software tools with which the user is able to manipulate a graphical representation of an algorithm for a configuration of the identity hub for associating data records from the set of data sources, the interface is configured to display a set of attributes and allow the user to select a representation of an attribute and to display a set of bucketing functions associated with the identity hub, allow the user to select a representation of a bucketing function, allow the user to create a representation of a bucketing group and associate the representation of the bucketing group with the representation of the bucketing function and the attribute and the interface is further configured to display a set of standardization functions associated with the identity hub, allow the user to select a representation of a standardization function and associate the representation of the attribute with the representation of the standardization function;

wherein the algorithm is created or modified according to the graphical representation of the algorithm as manipulated by the user utilizing the interface, and wherein the identity hub is correspondingly configured to associate data records by:

receiving a data record;

identifying a set of candidate data records, wherein identifying a set of candidate data records is done by comparing the data record to a set of existing data records according to the algorithm; and scoring each of the set of candidate data records, wherein a score of each of the set of candidate data records is calculated by comparing the data record to the candidate data record according to the algorithm and the score represents a probability of a match between the candidate data record and the received data record.

32. The system of claim 31, wherein the interface is configured to allow the user to enter configuration parameters for the bucketing function or the bucketing group.

33. The system of claim 31, wherein the set of candidate data records corresponds to the bucketing group and the identity hub identifies the set of candidate records using the bucketing function and the attribute.

34. The system of claim 33, wherein the interface is configured to display a set of comparison functions associated with the identity hub, allow the user to select a representation of a comparison function and associate the comparison function with the attribute.

35. The system of claim 33, wherein the interface is configured to allow the user to enter configuration parameters for the comparison function.

36. The system of claim 35, wherein the identity hub scores the set of candidate records using the comparison function and the attribute.

37. The system of claim 36, wherein the interface is configured to allow the user to enter configuration parameters for the standardization function.

38. The system of claim 36, wherein transforming a data record comprises transforming the attribute of the data record according to the standardization function.

39. The system of claim 38, wherein the interface is configured to allow the user to create a representation of a comparison role or a query role.

40. The system of claim 39, wherein the interface is configured to allow the user to associate the representation of the bucketing function with the representation of the comparison role, associate the representation of the comparison function with the representation of the comparison role or associate the representation of the comparison role with the standardization function.

41. The system of claim 40, wherein the interface is configured to allow the user to enter configuration parameters for the comparison role or query role.

42. The system of claim 31, wherein the interface is configured to verify the representation of the algorithm based on a set of rules.

43. The system of claim 42, wherein verifying the representation of the algorithm comprises verifying the associations between components of the representation of the algorithm.

44. The system of claim 42, wherein verifying the representation of the algorithm comprises verifying a configuration of one or more components of the representation of the algorithm.

45. The system of claim 31, wherein the interface is configured to highlight components associated with a selected component.

* * * * *